US012782929B2

(12) United States Patent
Boguslawski et al.

(10) Patent No.: US 12,782,929 B2

(45) Date of Patent: Nov. 3, 2026

(54) WELL SITE EDGE ANALYTICS

(71) Applicant: Schneider Electric Systems USA, Inc., Foxborough, MA (US)

(72) Inventors: Bartosz Boguslawski, Grenoble (FR); Reynaldo Espana Rey, Barcelona (ES); Giorgio Colangelo, Barcelona (ES); Matthieu Boujonnier, Foxborough, MA (US); Loryne Bissuel-Beuavais, Montreal (CA); Fahd Saghir, Brisbane (AU)

(73) Assignee: Schneider Electric Systems USA, Inc., Foxborough, MA (US)

( * ) Notice: Subject to any disclaimer, the term of this patent is extended or adjusted under 35 U.S.C. 154(b) by 1123 days.

(21) Appl. No.: 17/796,070

(22) PCT Filed: Jan. 29, 2021

(86) PCT No.: PCT/US2021/015886

§ 371 (c)(1),
(2) Date: Jul. 28, 2022

(87) PCT Pub. No.: WO2021/155272

PCT Pub. Date: Aug. 5, 2021

(65) Prior Publication Data

US 2023/0095709 A1 Mar. 30, 2023

Related U.S. Application Data

(63) Continuation-in-part of application No. PCT/US2020/026787, filed on Apr. 5, 2020.

(Continued)

(51) Int. Cl.

*G05B 23/02* (2006.01)
*E21B 47/008* (2012.01)

(Continued)

(52) U.S. Cl.

CPC ........ *G05B 23/0254* (2013.01); *E21B 47/008* (2020.05); *F04D 13/10* (2013.01);

(Continued)

(58) Field of Classification Search

CPC ...... G05B 23/0254; G05B 2219/45129; G05B 23/0221; G05B 23/024; E21B 47/008;

(Continued)

(56) References Cited

U.S. PATENT DOCUMENTS

2009/0055098 A1 2/2009 Mese et al.
2011/0220410 A1 * 9/2011 Aldred ...................... E21B 7/04 175/26

(Continued)

FOREIGN PATENT DOCUMENTS

CN 202111739 U 1/2012
CN 106761681 A 5/2017

(Continued)

OTHER PUBLICATIONS

Extended EP Search Report for App. 20721076.6 dated Oct. 5, 2021, 3 pages.

(Continued)

*Primary Examiner* — Saif A Alhija
(74) *Attorney, Agent, or Firm* — Quinn IP Law

(57) ABSTRACT

Systems and methods for real-time monitoring and control of well site operations employ well site edge analytics to detect abnormal operations. The systems and methods receive well site data from a remote programmable automation (PAC) controller at the well site, the well site data representing one or more operational parameters related to the well site operations. A probability is derived for a given slope for each one of the one or more operational parameters as correlated to a different one of the one or more operational parameters to produce correlated probabilities for the one or (Continued)

more operational parameters. A resultant probability is derived from the correlated probabilities for the one or more operational parameters and it is determined whether the resultant probability meets a preselected threshold probability value. A responsive action is initiated if the resultant probability fails to meet the preselected threshold probability value.

20 Claims, 27 Drawing Sheets

Related U.S. Application Data

(60) Provisional application No. 62/967,492, filed on Jan. 29, 2020, provisional application No. 62/829,834, filed on Apr. 5, 2019.

(51) Int. Cl.

| | |
|---|---|
| ***F04D 13/10*** | (2006.01) |
| ***F04D 15/00*** | (2006.01) |
| ***F04D 15/02*** | (2006.01) |
| ***G06N 20/20*** | (2019.01) |

(52) U.S. Cl.
CPC ......... *F04D 15/0066* (2013.01); *F04D 15/02* (2013.01); *G06N 20/20* (2019.01); *F05D 2270/709* (2013.01); *G05B 2219/45129* (2013.01)

(58) Field of Classification Search
CPC .... E21B 43/128; F04D 13/10; F04D 15/0066; F04D 15/02; F04D 15/0088; G06N 20/20; F05D 2270/709
See application file for complete search history.

(56) References Cited

U.S. PATENT DOCUMENTS

| | | | | |
|---|---|---|---|---|
| 2012/0035802 | A1 | 2/2012 | Suzuki | |
| 2015/0148919 | A1 | 5/2015 | Watson | |
| 2015/0167392 | A1 * | 6/2015 | Sugiura | E21B 7/04 175/45 |
| 2015/0241881 | A1 | 8/2015 | Ige et al. | |
| 2017/0076209 | A1 | 3/2017 | Sisk et al. | |
| 2017/0096889 | A1 * | 4/2017 | Blanckaert | E21B 44/00 |
| 2017/0177761 | A1 * | 6/2017 | Early | E21B 41/00 |
| 2018/0283157 | A1 | 10/2018 | Hadi et al. | |
| 2021/0081823 | A1 | 3/2021 | Boguslawski et al. | |

FOREIGN PATENT DOCUMENTS

| | | | |
|---|---|---|---|
| CN | 107642347 | A | 1/2018 |
| WO | 2016153895 | A1 | 9/2016 |
| WO | 2018165352 | A1 | 9/2018 |

OTHER PUBLICATIONS

Search Report and Written Opinion for PCT/US2020/026787 dated Jul. 16, 2020, 8 pages.
PCT International Preliminary Report on Patentability for PCT Application No. PCT/US2021/015886 dated Aug. 11, 2022.
PCT International Search Report for PCT Application No. PCT/US2021/015886 dated Aug. 11, 2022.

* cited by examiner

800

| active_leakage_current | flow | motor_loading_percentage | motor_winding_temperature | output_power | pump_differential_pressure | pump_discharge_pressure | pump_intake_pressure | run_frequency | vsd_motor_amps | vsd_output_amps | wellhead_pressure | event_type | pump |
|---|---|---|---|---|---|---|---|---|---|---|---|---|---|
| -13.7 | 52.7 | -4.0 | -4.7 | -5.1 | -46.9 | -46.2 | -39.4 | 0 | -4.1 | -4.2 | -45.1 | Cause 1 | SF114 |
| -5.6 | 54.2 | -3.8 | -9.8 | -9.7 | -46.3 | -46.2 | -42.9 | 0 | -3.7 | -3.8 | -45.1 | Cause 2 | SF114 |
| -1.2 | 53.6 | -3.8 | -16.1 | -13.3 | -44.1 | -44.8 | -43.3 | 0 | -3.9 | -4.0 | -43 | Cause 3 | SF114 |
| -22.6 | 48.5 | -10.0 | -8.8 | -9.3 | -40.6 | -41.0 | -35.6 | 0 | -9.4 | -9.5 | -45 | Cause 4 | F114 |
| -23.9 | 50.1 | -10.4 | -11.2 | -9.8 | -42.2 | -43.1 | -39.1 | 0 | -10.2 | -10.2 | -44 | Cause 5 | F114 |

802

804

FIG. 8

1200

Diagram Diagnostic Inputs

| | Event (1204) | time_window (1206) | Flow (1208) | WHPress (1210) | DischPress (1212) | IntakePress (1214) | Speed (1216) |
|---|---|---|---|---|---|---|---|
| × | broken shaft | 6,12 | -20 | -20 | -20 | 20 | 0 |
| × | hole in tubing | 6,12 | -15 | -15 | -15 | 15 | 0 |
| × | blockage at pump intake | 6,12 | -15 | -15 | -15 | 15 | 0 |
| × | blockage at perforations | 6,12 | -15 | -15 | -15 | -15 | 0 |
| × | increase in water cut | 6,12 | -15 | -15 | 15 | 15 | 0 |
| × | shut-in at surface | 3,6 | -20 | 20 | 20 | 20 | 0 |
| × | blockage in pump stages | 6,12 | -15 | -15 | -15 | 15 | 0 |
| × | increase in reservoir pressure | 6,12 | 15 | 15 | 15 | 15 | 0 |
| × | increase of free gas at pump intake | 6,12 | -15 | -15 | -15 | 15 | 0 |
| × | wearing stages | 6,12 | -15 | -15 | -15 | 15 | 0 |
| × | increase in frequency | 6,12 | 20 | 20 | 20 | -20 | 0 |
| × | open choke | 3,6 | 20 | -20 (1202) | -20 | -20 | 0 |

FIG. 12

WELL SITE EDGE ANALYTICS

CROSS-REFERENCE TO RELATED APPLICATIONS

This application for patent claims the benefit of priority to U.S. Provisional Application No. 62/967,492, entitled "Well Site Edge Analytics," filed Jan. 29, 2020, and is a continuation-in-part of International Application No. PCT/US2020/026787, entitled "Autonomous Failure Prediction and Pump Control for Well Optimization," filed Apr. 5, 2020, which claims the benefit of priority to U.S. Provisional Application No. 62/829,834, entitled "Autonomous Failure Prediction and Pump Control for Well Optimization," filed Apr. 5, 2019, and also to the above referenced U.S. Provisional Application No. 62/967,492, all of the foregoing applications being incorporated herein by reference.

TECHNICAL FIELD

The present disclosure relates to monitoring and controlling oil and gas wells to ensure proper operation of the wells and more particularly to methods and systems for real-time monitoring and controlling of well operations using well site edge analytics to detect occurrence of unusual events and operating conditions.

BACKGROUND

Oil and gas wells are commonly used to extract hydrocarbons from a subterranean formation. A typical well site includes a wellbore that has been drilled into the formation and sections of pipe or casing cemented in place within the wellbore to stabilize and protect the wellbore. The casing is perforated at a certain target depth in the wellbore to allow oil, gas, and other fluids to flow from the formation into the casing. Tubing is run down the casing to provide a conduit for the oil and gas to flow up to the surface where they are collected. The oil and gas can flow up the tubing naturally if there is sufficient pressure in the formation, but typically pumping equipment is needed at the well site to bring the fluids to the surface.

Oil and gas wells often operate unattended for extended intervals due to their location in remote areas. During these intervals, numerous environmental and other factors can affect operation of the wells. When problems arise, field personnel are typically required to travel to the well site, physically inspect the equipment, and make any needed repairs. This can be a costly and time-consuming endeavor, resulting in loss productivity and profitability for well owners and operators, and can also be dangerous for the field personnel.

Thus, while a number of advances have been made in the field of oil and gas production, it will be readily appreciated that improvements are continually needed.

SUMMARY

The present disclosure relates to systems and methods for real-time monitoring and control of well operations at a well site using edge analytics. The systems and methods deploy machine learning (ML) based analytics on an edge device directly at the well site to detect possible occurrence of unusual events and operating conditions and automatically respond to such events. The event detection may be based on trends identified in operational parameter data acquired from the well operations in real time. The trends may be identified by analyzing the rate of change of the data, and also by using statistical correlation techniques on the data. Upon detecting that an unusual event is likely occurring or will occur, the edge device can issue alerts regarding the event and take predefined steps to reduce potential damage resulting from such event. This can help decrease downtime and minimize lost productivity and cost as well as reduce health and safety risks for field personnel.

In general, in one aspect, embodiments of the present disclosure relate to an edge device installed at a well site and operable to monitor well site operations. The edge device comprises, among other things, a processor, and a storage device coupled to the processor and storing computer-readable instructions for a well site monitoring and control application thereon. The well site monitoring and control application causes the edge device to, among other things, receive well site data from a remote programmable automation (PAC) controller at the well site, the well site data representing one or more operational parameters related to the well site operations. The well site monitoring and control application also causes the edge device to derive a probability for a given slope for each one of the one or more operational parameters as correlated to a different one of the one or more operational parameters to produce correlated probabilities for the one or more operational parameters. The well site monitoring and control application further causes the edge device to derive a resultant probability from the correlated probabilities for the one or more operational parameters, and determine whether the resultant probability meets a preselected threshold probability value. A responsive action is initiated by the edge device if the resultant probability fails to meet the preselected threshold probability value.

In accordance with any one or more of the foregoing embodiments, the well site operations include pump operations performed by an ESP at the well site and the well site data includes data related to the pump operations by the ESP at the well site.

In accordance with any one or more of the foregoing embodiments, the monitoring and control application causes the edge device to derive the resultant probability from the correlated probabilities by taking an average of the correlated probabilities over a predefined time interval. In accordance with any one or more of the foregoing embodiments, the predefined time interval has a duration between one minute and 10 minutes. In accordance with any one or more of the foregoing embodiments, the monitoring and control application causes the edge device to determine a slope for the resultant probability and estimate a time remaining until the resultant probability fails to meet the preselected threshold probability value based on the slope.

In accordance with any one or more of the foregoing embodiments, the method further comprises the monitoring and control application further causes the edge device to determine a correlated probability from among the correlated probabilities that most frequently falls below the average of the correlated probabilities, and identify operational parameters associated with the correlated probability as causing the resultant probability to fail to meet the preselected threshold probability value. In accordance with any one or more of the foregoing embodiments, the preselected threshold probability value is one of a medium severity threshold probability value and a high severity threshold probability value.

In general, in another aspect, embodiments of the present disclosure relate to a method of monitoring well site operations. The method comprises, among other things, receiving well site data from a remote programmable automation (PAC) controller at the well site, the well site data representing one or more operational parameters related to the well site operations. The method also comprises deriving a probability for a given slope for each one of the one or more operational parameters as correlated to a different one of the one or more operational parameters to produce correlated probabilities for the one or more operational parameters. The method further comprises deriving a resultant probability from the correlated probabilities for the one or more operational parameters, and determining whether the resultant probability meets a preselected threshold probability value. A responsive action is initiated if the resultant probability fails to meet the preselected threshold probability value.

In general, in yet another aspect, the present disclosure relates a non-transitory computer-readable medium containing program logic that, when executed by operation of one or more computer processors, performs well site monitoring operations according to any one or more of the embodiments disclosed herein.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

FIG. 8 is a table showing a portion of exemplary database for correlation-based event detection at a well site edge device according to embodiments of the present disclosure;

FIG. 12 is a table showing exemplary slopes for diagram-based event detection at a well site edge device according to embodiments of the present disclosure;

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
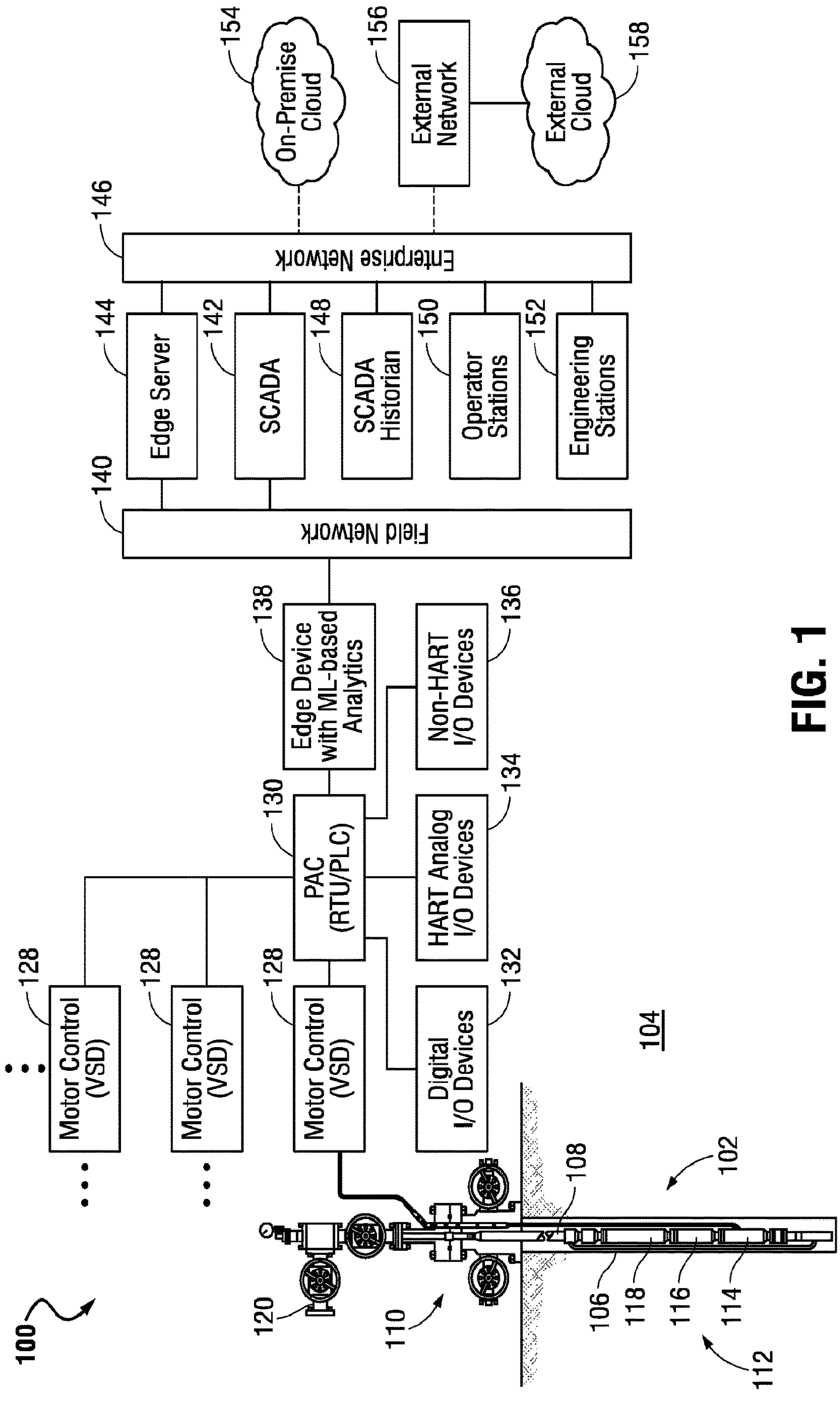
FIG. 1 is a schematic diagram of an exemplary implementation of ML-based analytics at a well site according to embodiments of the present disclosure.

This description and the accompanying drawings illustrate exemplary embodiments of the present disclosure and should not be taken as limiting, with the claims defining the scope of the present disclosure, including equivalents. Various mechanical, compositional, structural, electrical, and operational changes may be made without departing from the scope of this description and the claims, including equivalents. In some instances, well-known structures and techniques have not been shown or described in detail so as not to obscure the disclosure. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

It is noted that, as used in this specification and the appended claims, the singular forms "a," "an," and "the," and any singular use of any word, include plural references unless expressly and unequivocally limited to one reference. As used herein, the term "includes" and its grammatical variants are intended to be non-limiting, such that recitation of items in a list is not to the exclusion of other like items that can be substituted or added to the listed items.

At a high level, embodiments of the present disclosure provide systems and methods for real-time monitoring and control of well operations using machine learning (ML) based analytics at a well site. The term "analytics" as used herein generally refers to the analysis of data and the recognition and detection of meaningful patterns in the data. The disclosed systems and methods deploy ML-based analytics on an edge device directly at the well site to detect unusual events and abnormal operating conditions and automatically respond to same. The term "edge device" as used herein refers to devices that are designed to provide access or entry to a network, such as a local area network (LAN), wide area network (WAN), metropolitan area network (MAN), and the like. Being able to perform ML-based analytics on edge devices provides numerous benefits, especially for remotely located well sites where computing resources usually required for ML modeling may not otherwise be available. In such cases (and other cases), performing ML modeling on an edge device allows operators to proactively manage the remote well sites. In particular, an edge device equipped with ML-based analytics can automatically detect events and operating conditions that could indicate non-optimal production and possible equipment failure, issue alerts regarding the events, and take predefined steps to reduce potential damage resulting therefrom. Such an edge analytics platform (EAP) can help decrease downtime and thereby minimize lost productivity and cost as well as reduce health and safety risks for personnel who may otherwise have to make unscheduled trips to the well sites (i.e., less "windshield time").

The above benefits become even more apparent when the EAP is implemented at well sites in conjunction with the broader movement toward a so-called Industrial Internet of Things (IIoT). In an IIoT landscape, well site operators increasingly make use of interconnected sensors and devices to collect and store large amounts of data directly at the well sites. This data can then be processed at the well sites by an edge device equipped with ML modeling to monitor and control well operations. Consider a well site that employs an electric submersible pump (ESP) to produce oil from a wellbore. Large amounts of raw data are commonly collected during operation of the ESP, including wellhead pressure, pump discharge pressure, pump intake pressure, pump intake temperature, pump flow rate, motor temperature, and the like. An edge device equipped with ML modeling can process the data in real time and recognize patterns in the data that could lead to failure of the ESP. The edge device can then generate alarms, carry out contingent actions, and store the results of the processing on local servers and/or to the cloud as needed. The locally generated data, once labeled and processed, may be used to update and further train the ML models, commission new edge devices, and generally improve well site operations.

Exemplary embodiments of the EAP herein can autonomously control ESP operations at a well site based on real-time data gathered from surface and sub-surface sensors. Such embodiments may include system and method of building an event-based ML model to recognize patterns in time series data and other data sources and to act on such patterns to improve/mitigate well performance. In this regard, multivariate time-series data is received from sensors attached to, for example, variable speed drives (VSD), downhole gauges, and surface instruments from various on-shore well sites and off-shore platforms. For the latter, the data is commonly available at an on-shore control room and this is where the edge analytics solution may be deployed.

The EAP discussed herein can capture high frequency data and apply pattern recognition algorithms that provide early indication of abnormal ESP performance. The captured and verified patterns can then be used to reduce unplanned downtime, manage rig activity, improve production and enhance operator experience. Other advantages of the techniques of the disclosure include the ability of the EAP to detect abnormal ESP performance patterns in near real-time based on high-frequency data captured from surface and sub-surface sensors; the ability of the ML models to predict abnormal events and notify and/or undertake corrective actions based on a pre-determined workflows; the ability of the EAP to improve ESP performance which translates into production optimization by tracking key performance indicators (KPI) set by operation and production constraints; and the ability of the EAP to iterate the ML models through a time period in which prediction accuracy improves over time through operator feedback, captured knowledge and real-world experiences to improve model accuracy. The latter may be done through Transfer Learning techniques to improve model accuracy. Various types of analytical algorithms may be applied to the raw high frequency data to identify trends in the data that occur during a determined time period. The trends may be patterns of behavior that are observed for a set of data inputs which is consistent over the determined time period. The pre-trained ML models are used to predict any abnormal behavior, whether ESP or production related, and corrective action may be taken, for example, through VSD speed control to improve/mitigate well performance. Such corrective action may be in the form of a configurable template that indicates the type of action to take depending on the abnormal behavior predicted, like speeding up the pump to remove sand in the pump, and so forth. For example, the EAP may send a control command to speed up the pump for a determined time period to avert the occurrence of the abnormal behavior.

In short, embodiments of the present disclosure provide methods and systems for developing and deploying robust ML modeling in an IIoT environment to automatically detect unusual events and non-optimal operations directly at the well site, and also ensure a high level of accuracy for the predictions through ML-based analytics, thereby engendering increased operator confidence. Such unusual events and non-optimal operations are referred to hereinafter simply as "events" and may include, for example, a broken pump shaft, a hole in the tubing, blockage at a pump intake, an increase in water cut (i.e., amount of water in well fluid), a shut-in at the surface (i.e., a closed-off well), a blockage in a pump stage, an increase in reservoir pressure, an increase of free gas at the pump intake, wear-and-tear at a pump stage, increased motor vibration, open choke, and the like. It should also be understood that the terms "detect" and "predict" are used interchangeably herein to refer to the ability of the EAP to predict an event based on detection of patterns in the underlying data.

Referring now to FIG. 1, a schematic diagram of an exemplary EAP implementation at a well site 100 is shown according to embodiments of the present disclosure. As can be seen, a wellbore 102 has been drilled into a subterranean formation 104 at the well site 100 and casing 106 has been cemented into the wellbore 102. Tubing 108 extends from a wellhead 110 down the wellbore 102 through the casing 106 to receive and bring up oil (or other fluids) from the formation 104. The formation 104 in this example no longer has sufficient formation pressure to produce oil naturally and therefore artificial lift is provided via an ESP 112 installed at the well site 100. The ESP 112 typically includes a motor 114, a seal 116, and a pump 118, connected as shown. Operation of the ESP 112 is well known to those skilled in the art and thus other common components, such as a motor crossover base, ground fault gauge, and the like, are omitted here for economy. A discharge line 120 carries the oil (or other fluids) produced from the wellbore 102 to one or more holding tanks (not expressly shown) for storage and processing at the surface.

At the surface, a motor control unit 128, usually a variable speed drive (VSD), provides power (i.e., current and voltage) to the ESP 112 and regulates the operating speed thereof. The motor control unit 128 is in turn controlled by a programmable automation controller (PAC) 130, which may provide similar control functions as a remote terminal unit (RTU), a programmable logic controller (PLC), or other similar programmable controllers. The PAC 130 receives data about ESP operations from the motor control unit 128, including motor speed and load, and gathers data on other operational parameters from the wellbore 102, such as flow rate, pressure, temperature, and the like. This data may be provided by various wireless and wired I/O devices positioned at locations around and within the wellbore 102, including digital I/O devices 132, HART analog I/O devices 134, and non-HART analog I/O devices 136. Examples of I/O devices include temperature sensors, pressure sensors, flow rate sensors, proximity sensors, current/voltage sensors, vibration sensors, various actuators, and the like. From the acquired data, the PAC 130 can monitor and control operation of the ESP 112 and other operations at the wellbore 102 according to a programming thereof.

The motor control unit 128 may be one of several motor control units 128, each controlling a respective ESP (not shown) for a respective well, that are connected to and controlled by the PAC 130. The PAC 130 receives data about ESP operations from each motor control unit 128 along with data on other well operational parameters that is provided by wireless and wired I/O devices at the well of each ESP. An edge device 138 provides an access or entry point for the PAC 130 to a field network 140 that allows the PAC 130 to communicate the collected data to a control system, such as a supervisory control and data acquisition (SCADA) system 142. Any type of edge device or appliance may be used as the edge device 138 provided the device has sufficient processing capacity for the purposes discussed herein. Examples of suitable edge devices include gateways, routers, routing switches, integrated access devices (IADs), and various MAN and WAN access devices.

An edge server 144 may also be provided in some embodiments that connects the field network 140 to an enterprise network 146. From there, the data may be forwarded to other systems within an enterprise, such as a SCADA historian 148, one or more operator stations 150, one or more engineering stations 152, and the like. In some embodiments, the data may also be communicated to a private enterprise cloud, such an on-premise cloud (OPC) 154, for further processing as needed. Optionally, for applications where strict data security is less of a concern, the data may also be communicated to an external network 156 like the Internet, and subsequently to an external cloud 158 for further processing as needed. In accordance with embodiments of the present disclosure, the edge device 138 is provided with the ability to perform ML-based analytics on data about ESP operations and other operations at the wellbore 102, as discussed below.

Figure 2:
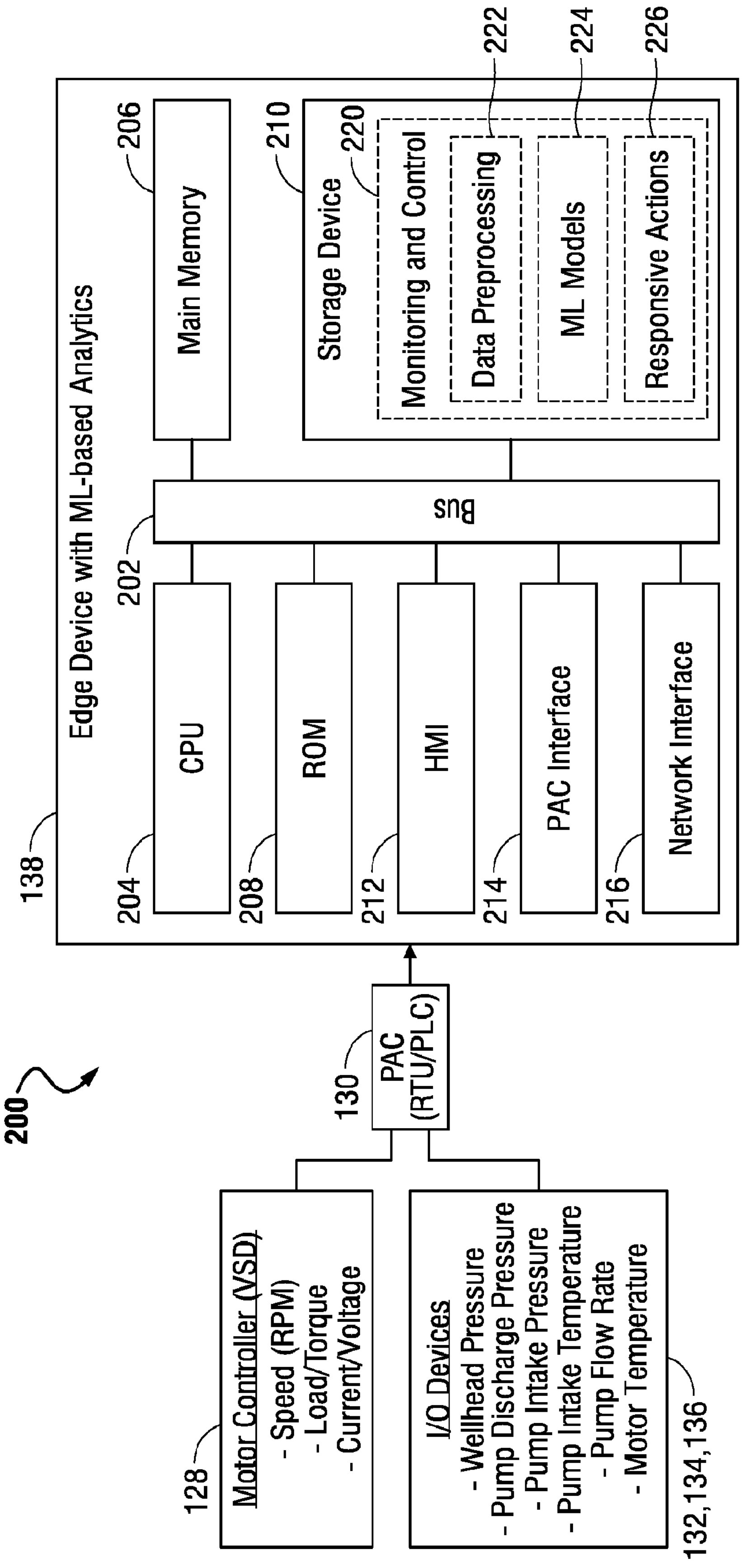
FIG. 2 is a block diagram of an exemplary edge device that can perform ML-based analytics at a well site according to embodiments of the present disclosure.

FIG. 2 is a block diagram illustrating an exemplary hardware architecture 200 for the edge device 138 in accordance with embodiments of the present disclosure. The edge device 138 shown here is a gateway. In one embodiment, the edge gateway 138 includes a bus 202 or other communication pathway for transferring information within the gateway, and a CPU 204, such as an ARM microprocessor, coupled with the bus 202 for processing the information. The edge gateway 138 may also include a main memory 206, such as a random-access memory (RAM) or other dynamic storage device coupled to the bus 202 for storing computer-readable instructions to be executed by the CPU 204. The main memory 206 may also be used for storing temporary variables or other intermediate information during execution of the instructions executed by the CPU 204.

The edge gateway 138 may further include a read-only memory (ROM) 208 or other static storage device coupled to the bus 202 for storing static information and instructions for the CPU 204. A computer-readable storage device 210, such as a nonvolatile memory (e.g., Flash memory) drive or magnetic disk, may be coupled to the bus 202 for storing information and instructions for the CPU 204. The CPU 204 may also be coupled via the bus 202 to a human-machine interface (HMI) 212, such as a touchscreen interface, for displaying information to a user and allowing the user to interact with the edge gateway 138. A PAC interface 214 may be coupled to the bus 202 for allowing the edge gateway 138 to communicate with the PAC 130 or similar programmable controllers. A network or communications interface 216 may be provided for allowing the edge gateway 138 to communicate with the external system, such as the SCADA system 140 and/or the network 142.

The term "computer-readable instructions" as used above refers to any instructions that may be performed by the CPU 204 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device 210. Volatile media may include dynamic memory, such as main memory 206. Transmission media may include coaxial cables, copper wire and fiber optics, including wires of the bus 202. Transmission itself may take the form of electromagnetic, acoustic or light waves, such as those generated during radio frequency (RF) and infrared (IR) data communications. Common forms of computer-readable media may include, for example, magnetic medium, optical medium, memory chip, and any other medium from which a computer can read.

A well site monitoring and control application 220, or rather the computer-readable instructions therefor, may also reside on or be downloaded to the storage device 210. The well site monitoring and control application 220 may be executed by the CPU 204 and/or other components of the edge gateway 138 to perform ML-based analytics on data from the PAC 130 to automatically detect events and generate a response thereto. Such a monitoring and control application 220 may be written in any suitable computer programming language known to those skilled in the art using any suitable software development environment known. Examples of suitable programming languages may include C, C++, C#, Python, Java, Perl, and the like.

In accordance with the exemplary embodiments, the well site monitoring and control application 220 may include, among other things, a data preprocessing module 222, one or more ML algorithms or models 224, and a responsive action module 226. The data preprocessing module 222, as the name suggests, performs preprocessing (e.g., filtering, smoothing, amplifying, etc.) on data received from the PAC 130 for the monitoring and control application 220. The monitoring and control application 220 inputs the preprocessed data to the one or more ML models 224 for processing to determine whether the data matches or otherwise resembles one or more known data patterns. In preferred embodiments, the monitoring and control application 220 employs Ensemble modeling where multiple different ML models 224 are combined to achieve more accurate results. An Ensemble model is thus sometimes referred to as a meta model. Based on the results of the ML model processing, the responsive action module 226 takes appropriate responsive actions ranging from logging the date and time of the occurrence, to sending an alert message to the SCADA system 142 and/or authorized personnel, to instructing the PAC 130 to cut power to the ESP 112. Note that although ML models are mainly discussed, those having ordinary skill in the art will understand that empirical models may also be used in addition to or instead of the ML models for the purposes herein.

Figure 3:
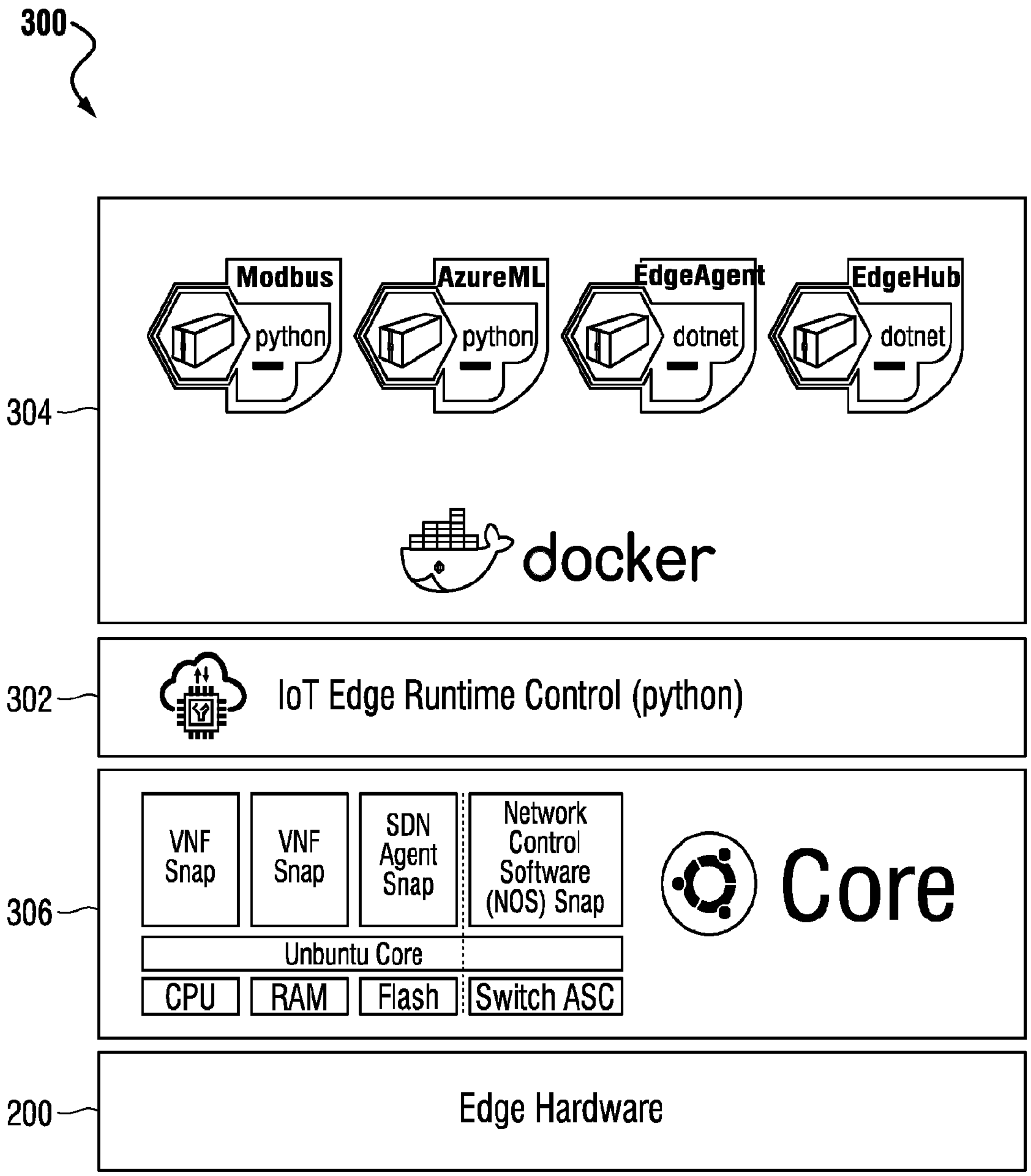
FIG. 3 is a block diagram of an exemplary software architecture for deploying ML-based analytics to a well site edge device according to embodiments of the present disclosure.

FIG. 3 shows an exemplary architecture 300 that may be used to deploy the ML models 224 (and associated modules) on the edge gateway 138. The edge architecture 300 in this example uses Microsoft IoT Edge 302, which decomposes the local processing between Docker containers 304 on top of an Ubuntu core 306 to support embedded constraints. This container-based architecture simplifies deployment, but requires Linux-based gateways that are capable of running Linux OS variants, and also minimal computing resources (i.e., CPU, memory) similar to the well-known Raspberry Pi hardware. The containers 304 used for prediction in this example include MODBUS, which enables Modbus communication between the PAC 130 and the edge gateway 138. Also included is AzureML, which facilitates machine learning on Azure, and EdgeAgent, which checks hardware integrity and ensures all necessary processes are running seamlessly. And the EdgeHub container enables communication with a cloud platform (e.g., via an MATT protocol) using a publish/subscribe methodology. Cloud-connectivity allows the edge gateway 138 to be remotely monitored and managed for maintenance purpose, as well as for tracking the effectiveness and accuracy of the ML models 224, and can also trigger Transfer Learning remotely, a process known to those skilled in the art whereby knowledge gained while solving one problem is applied to a different but related problem. In short, the ML model deployment architecture 300 depicted in FIG. 3 is applicable to any edge gateway that meets minimum hardware requirements, and the use of the containers 304 to deploy the ML models and other associated components makes interoperability with different hardware platforms more seamless and easier to manage. Those having ordinary skill in the art will understand that the invention is not limited to this particular selection and arrangement of containers, and that additional and/or alternative containers may be used within the scope of the present disclosure.

Before deployment on the edge device 138, the one or more ML models 224 first need to be trained to detect various types of events that are expected to occur in the field. In general, embodiments of the present disclosure contemplate two types of event detection techniques, a diagram diagnostic technique and a multivariate correlation technique. The diagram diagnostic technique generally detects events based on the time rates of change, or slopes, of data representing various well operational parameters (including ESP parameters) over a sliding time window. Combinations of parameters having certain slopes are compared against known combinations of parameter slopes for various events. For example, if the flow rate, wellhead pressure, and current are all decreasing while the pump discharge pressure is increasing, then the ESP is likely experiencing or will soon experience a broken shaft, and so forth. The multivariate correlation technique generally detects events based on a statistical correlation among the slopes of the various well operational parameters over a given time window. Either technique may be used alone for event detection herein, and preferably both techniques are used in parallel to complement one another. Regardless of which technique is used, or both, the ML models 224 first need to undergo training before they can detect events with sufficient accuracy, as generally depicted in FIG. 4.

Figure 4:
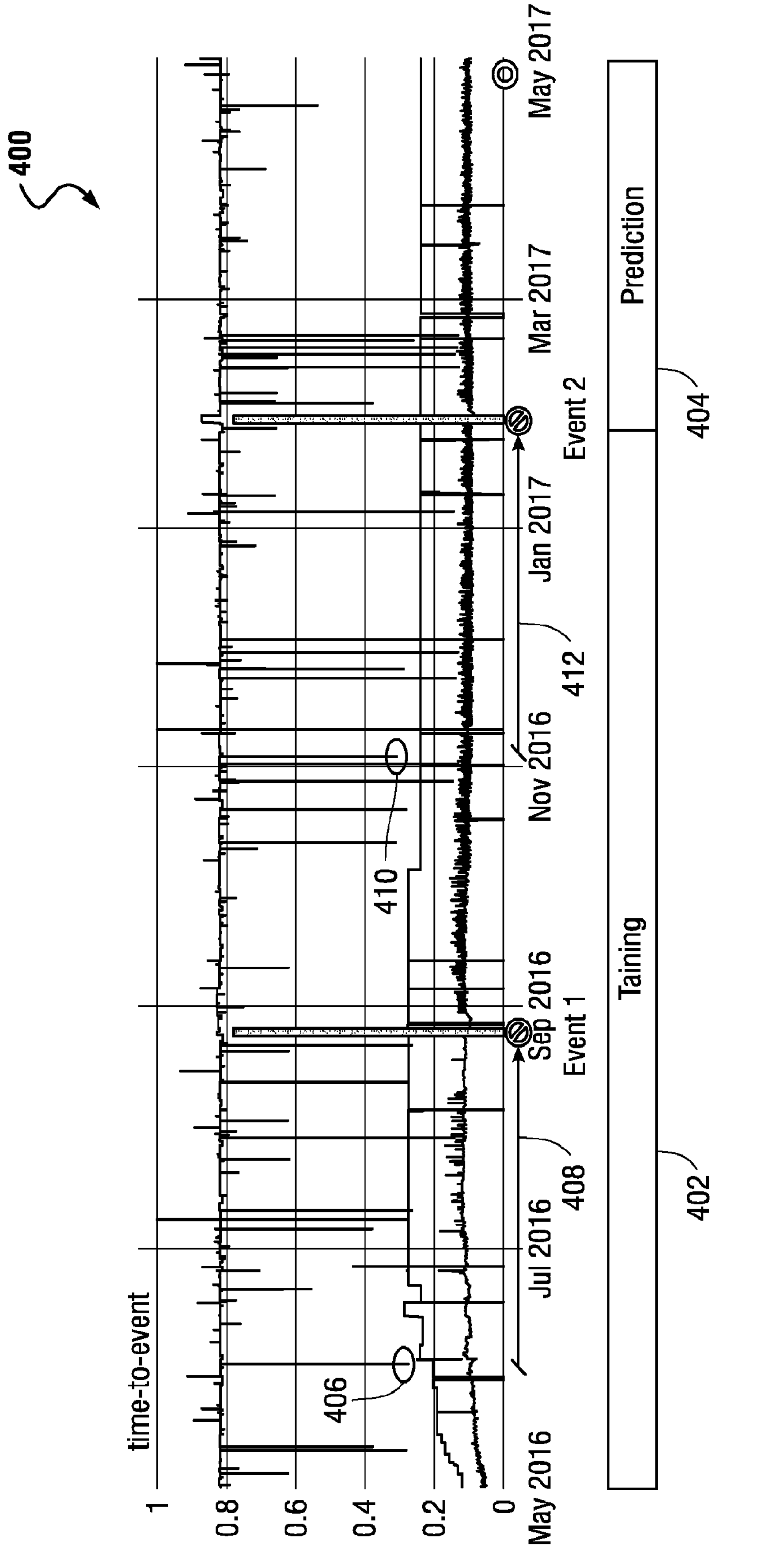
FIG. 4 is a graph showing exemplary operational phases for ML-based analytics at a well site edge device according to embodiments of the present disclosure.

In FIG. 4, a graph 400 shows several graph lines, each line representing data points for a well operational parameter (e.g., flow rate, pressure, temperature, voltage, current, etc.). This graph 400 and similar graphs herein are sometimes referred to as data diagrams. As graph 400 shows, there are generally two operational phases for the ML models 224, a training phase 402 during which the models are trained to recognize different events using historical datasets, and a prediction phase 404 when the trained models are used to infer different events from data acquired in real time.

The historical datasets generally contain measurements (e.g., from I/O devices 132-136) of various operational parameters that were acquired during previous operations of the ESP 112 and/or other ESPs. These parameters may include motor current, motor voltage, motor load, leakage current, motor temperature, motor output power, pump intake pressure, pump discharge pressure, wellhead pressure, flow rate, and the like. Preferably, the historical datasets are specific to a particular ESP 112 in order to customize performance of the (initially generic) ML models 224 with respect to that ESP. In either case, the training teaches the ML models 124 to recognize patterns in the data suggesting that an event is currently happening or will happen within a certain amount of time if uncorrected.

Training may be done in some embodiments using a self-supervised learning method in which labeled historical data is applied as an input to the ML models. Labeling refers to the process of annotating or describing the data and creating a label or tag for the data. The training may be done offsite (e.g., on the OPC 154) or at the well site 100 and may involve the use of commercially available ML training tools to develop and verify the ML models. Developing the ML models on either the OPC 154 or some other computing cluster platform has an added benefit in the availability thereon of enhanced hardware resources that provide high computational capabilities, which can prove useful during the training phase. Data preprocessing and preparation form a key part of this process, as properly labeled data is needed to produce a highly accurate ML model.

The tagged or labeled historical data is then used to train generic ML models that start out as neutral with respect to ESP type so as to extend the capability of the trained models to generalized data produced by any type of ESP. Examples of generic ML models that may be trained include Convolutional Neural Networks (CNN), Siamese Neural Networks, Support Vector Machines (SVN), Autoencoder Neural Networks, and the like. Model predictions may optionally be aggregated using Ensemble modeling techniques, which give more weight to a model based on its accuracy for a given class of problems. The trained ML models 224 are then assessed against another training dataset that was not used in the initial model training stage for verification purposes. Depending on required prediction accuracy levels (i.e., QoS), the training phase can be repeated until satisfactory results are achieved. Model performance can be improved either by refining data preprocessing techniques, such as requiring the use of high-resolution data, by increasing the number of datasets, and the like.

In the FIG. 4 example, the historical datasets help the ML models 224 to recognize that when a certain parameter or combination of parameters (e.g., motor leakage current, motor temperature, etc.) exhibit a particular behavior 406, such as a certain combination of slopes or slopes that exceed a certain correlation threshold over a given time window, then Event 1 (e.g., broken pump shaft) usually occurs within a certain amount of time 408, or time-to-event, if no corrective action is taken. Similarly, the historical datasets may help the ML models 224 to recognize that when another parameter or combination of parameters (e.g., pump intake pressure, pump discharge pressure, etc.) exhibit another behavior 410, then Event 2 (e.g., blocked pump intake) usually occurs within a certain time-to-event 412 if no corrective action is taken. The pattern recognition training (as well as subsequent inferences) may take place on a stepwise basis with respect to the data points, such as within 1-minute windows, 10-minute windows, 30-minute windows, or some other selected time increment.

After satisfactory results are achieved from the learning phase, the trained and verified ML models 224 can be deployed to the edge gateway 138. In some embodiments, the models are deployed with the commissioning of the edge gateway 138 when it is connected to the PAC 130 (i.e., without connectivity to the cloud). Although edge gateways usually have a higher processing capability relative to a typical PAC, consideration should be given to the type of ML models that can run efficiently on each type of edge gateway 138 to help provide satisfactory response times for prediction or inference purposes. This helps ensure that the response time from an ML model is sufficiently fast to identify any abnormal data in a timely manner in order to allow effective action either automatically or by an operator.

Once the ML models 224 and their supporting components are deployed on the edge gateway 138, real-time prediction or inferencing can commence with the gateway receiving data from the PAC 130. The edge gateway 138 receives the data from the PAC 130 in real time as raw data points reflecting measurements of various parameters, then uses the preprocessing module 222 of the monitoring and control application 220 to preprocess (e.g., filter, smooth, amplify, etc.) the data points. The ML models 224 deployed on the edge gateway 138 then process the data points to infer various events therefrom and output information regarding any inferred events. The responsive actions module 226 receives this output and takes certain selected actions based on the output, including raising an immediate flag to the SCADA system 142. In some embodiments, the output from the ML models 224 is also provided as a feedback to the PAC 130 to take programmed corrective actions, such as adjusting a motor speed of the ESP 112 or cutting power to the ESP.

In some embodiments, the ability of the ML models 224 to accurately infer various events from the data using multivariate correlation is based on the extension of pairwise probability calculation techniques to multiple parameters, as shown and described in FIGS. 5-8.

Figure 5:
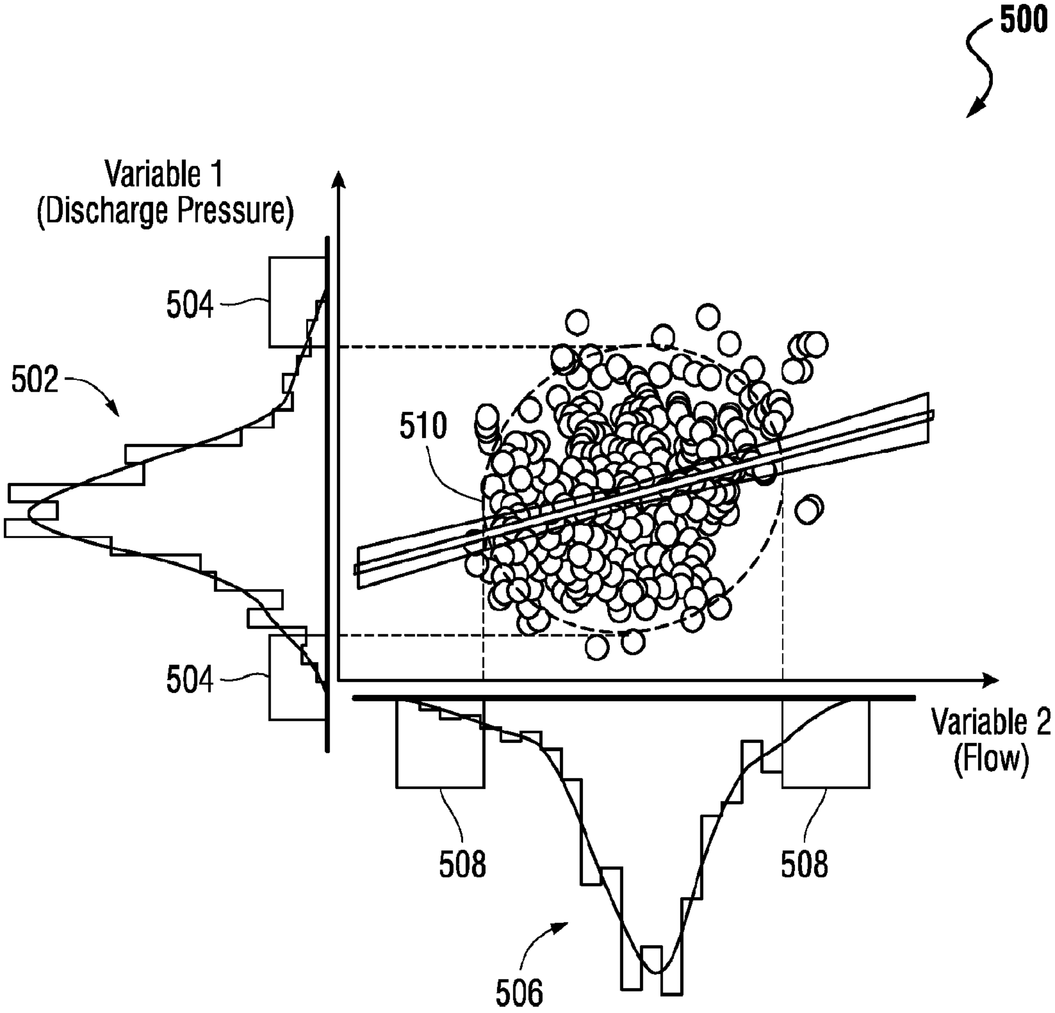
FIG. 5 is a data plot exemplifying 2-variable outlier detection according to embodiments of the present disclosure.

Turning now to FIG. 5, by way of background, an exemplary data plot 500 is shown of data points reflecting two parameters, Variable 1 (e.g., discharge pressure) and Variable 2 (e.g., flow), with one parameter being dependent on or correlated to the other. A distribution of typical or statistically likely data points along Variable 1 is indicated at 502 and statistically unlikely outliers are indicated at 504, while a distribution of typical or statistically likely data points along Variable 2 is indicated at 506 with statistically unlikely outliers indicated at 508. Area 510 defines the distribution of the statistically likely data points within plot 500. By analyzing the distribution of data points for the various parameters collected over time, models can be developed based on the time rate of change or slope of the parameters using the distribution of statistically likely data points.

Figure 6:
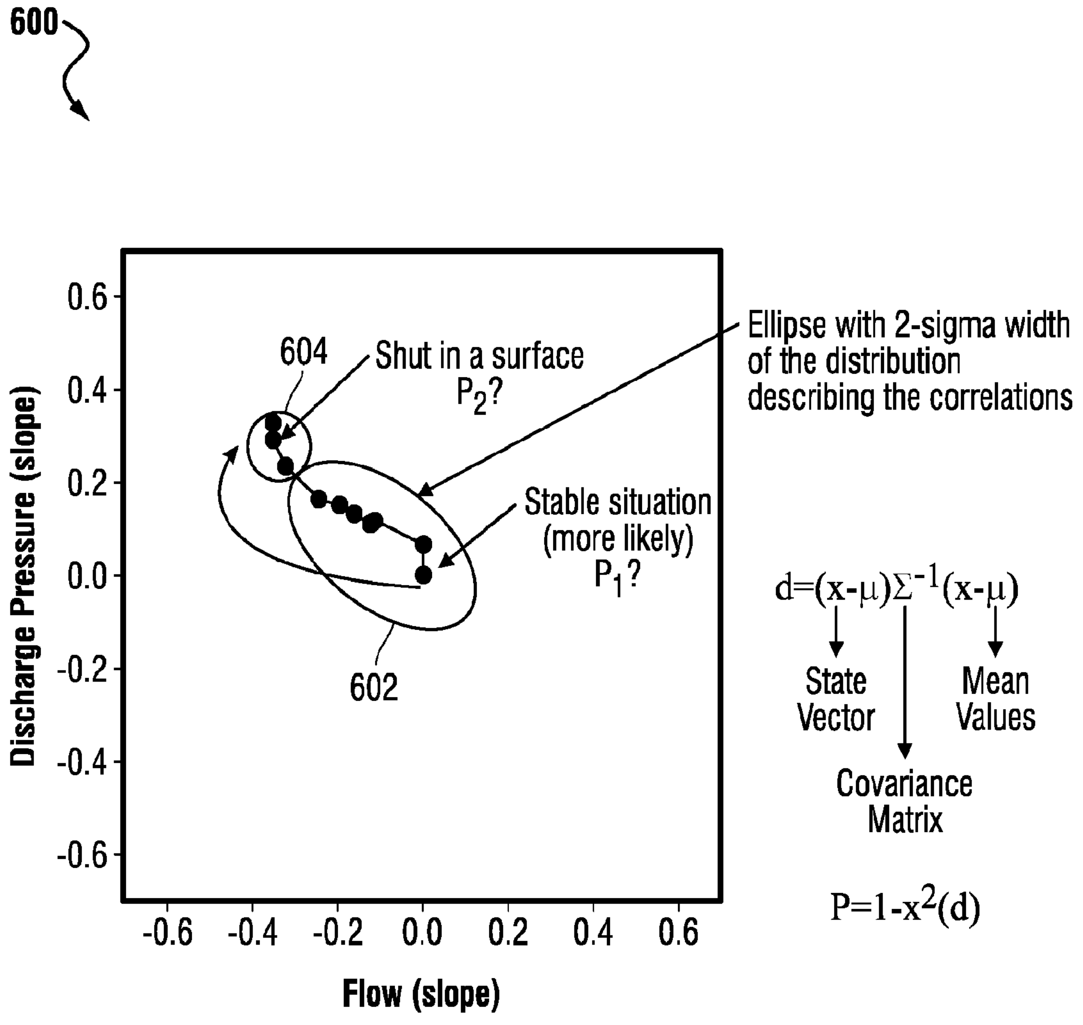
FIG. 6 is a probability plot showing evolution of a system from a stable normal operation to an abnormal event according to embodiments of the present disclosure.

FIG. 6 is an exemplary probability plot 600 illustrating the likelihood of the parameters from FIG. 5 having a given slope based on the distribution of data points for the parameters (i.e., evolution from a stable normal operation to an abnormal operation). In the figure, ellipse 602 indicates a region where the slopes of the parameters are likely to be found under normal operating conditions, within a 2-sigma confidence level (i.e., within 95% confidence). In other words, parameters having a slope within this region 602 indicate that the ESP is likely to be stable or operating normally. In contrast, circle 604 indicates a region where the slopes of the parameters are less likely to be found. Parameters that have slopes within this region 604 indicate that the ESP is likely to be unstable or operating abnormally (e.g., due to a shut-in at the surface).

The above probabilities can be determined by calculating a Mahalanobis distance d for the data in a manner known to those skilled in the art, as follows:

$$d=(x-\mu)\Sigma^{-1}(x-\mu) \tag{1}$$

In Equation (1), x is a state vector representing the slopes for a given parameter, and μ is the mean value for the state vector. The probability P that a slope will be found within a given region can be determined by Equation (2):

$$P=1-\chi^2(d) \tag{2}$$

Figure 7:
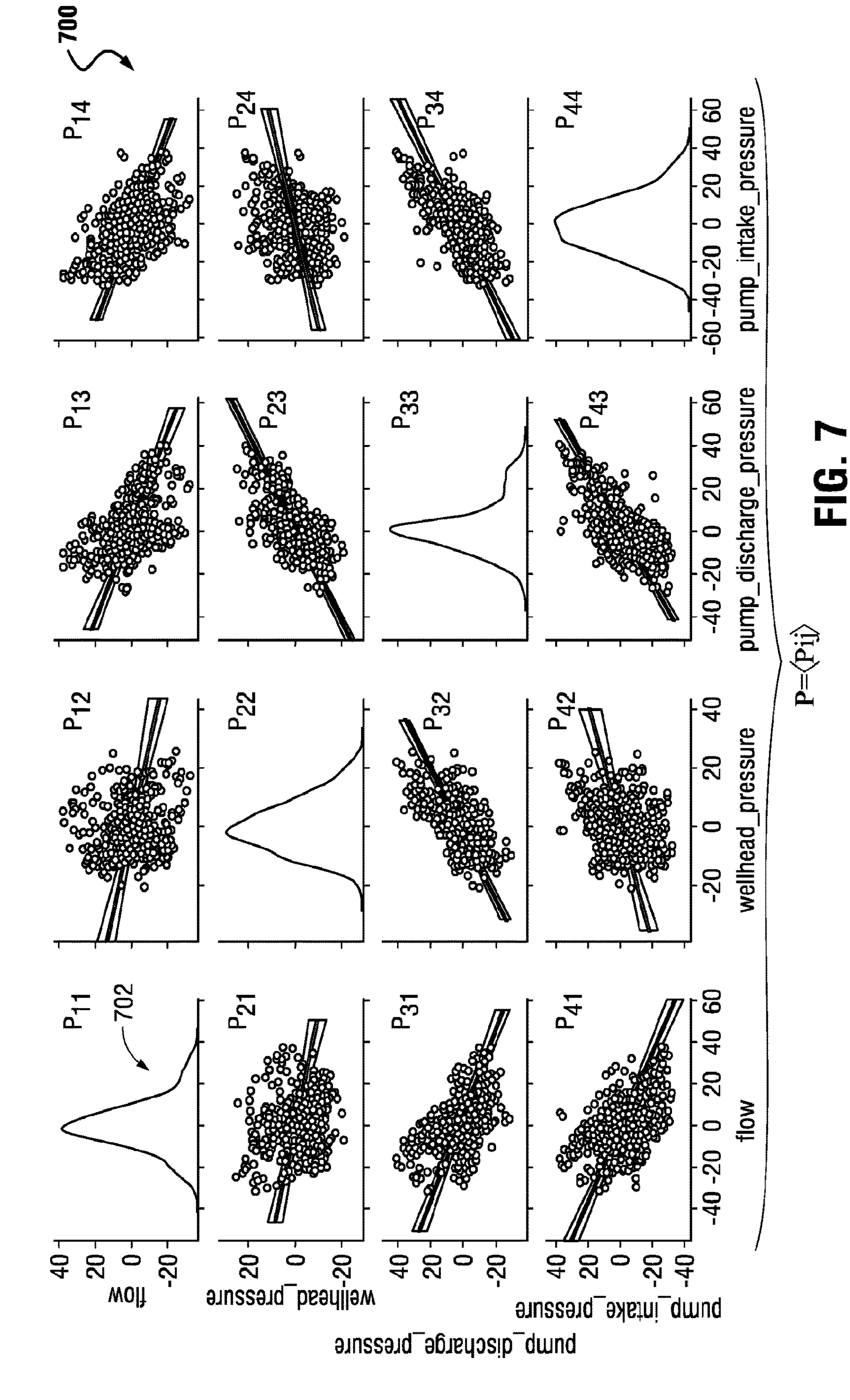
FIG. 7 is an array of probability plots depicting multivariable probability determinations according to embodiments of the present disclosure.

Better modeling performance has been observed when the correlation is extended to more than two parameters, then mathematically combined (e.g., averaged), as graphically illustrated in FIG. 7. In this figure, an array 700 of plots, one of which is indicated at 702, showing distribution of data points for several pairs of parameters is shown, including flow, wellhead pressure, pump discharge pressure, and pump intake pressure. The probabilities for the slopes of each parameter as correlated to one of the other parameters is represented by $P_{n,m}$. For example, the probabilities for the slopes of the flow rate as correlated to wellhead pressure is represented by $P_{1,2}$, while the probabilities for the slopes of the flow rate as correlated to the pump discharge pressure is represented by $P_{1,3}$, and so on. The resultant probability P may then be determined by averaging the constituent probabilities or otherwise mathematically combining them, as generally represented by Equation 3:

$$P=\langle P_{ij}\rangle \tag{3}$$

Initial thresholds may then be set, as shown in FIG. 8, to allow correlation-based ML models 224 to detect slopes that reflect events occurring currently or will occur within a certain amount of time (based on historical data). In FIG. 8, an initial correlation database 800 (or portion thereof) is shown containing threshold slopes 802 (rows) in degrees for a number of well operational parameters (columns). These threshold slopes 802 are considered to be strongly indicative of or associated with certain types of known events (causes) 804 at the well site based on the statistical correlation discussed above and may be either minimum or maximum thresholds depending on the particular parameter. There may be multiple rows of slopes corresponding to the same type of event (cause) 804. This correlation database 800 may then be used to automatically recognize an event from incoming data if the slopes derived from the data are sufficiently close to the entries in the database. The database 800 may be updated and enriched over time, both automatically and via manual user feedback, which allows for less human intervention for already known types of events.

A user may modify one or more of the threshold slopes 802 from time to time as needed, for example, based on real-world experience or observations. The types of events 804 reflected by the slopes may also be defined (and redefined) by a user from time to time as needed. Newly detected (unassigned) events from the data may be associated with existing events based on specified slope difference parameters, for example. The decision to associate a newly detected (and not yet assigned) event to an event type already present in the database 800 may thus be made based on the degrees of difference between the slopes of each signal of the newly detected event and the slopes of the corresponding signals for an event already in the correlation database 800. The degrees of difference required before the unassigned event can be identified as being the same as an event type in the database 800 may be adjusted as needed by adjusting a specified slope difference parameter for each signal, for example.

Figure 9:
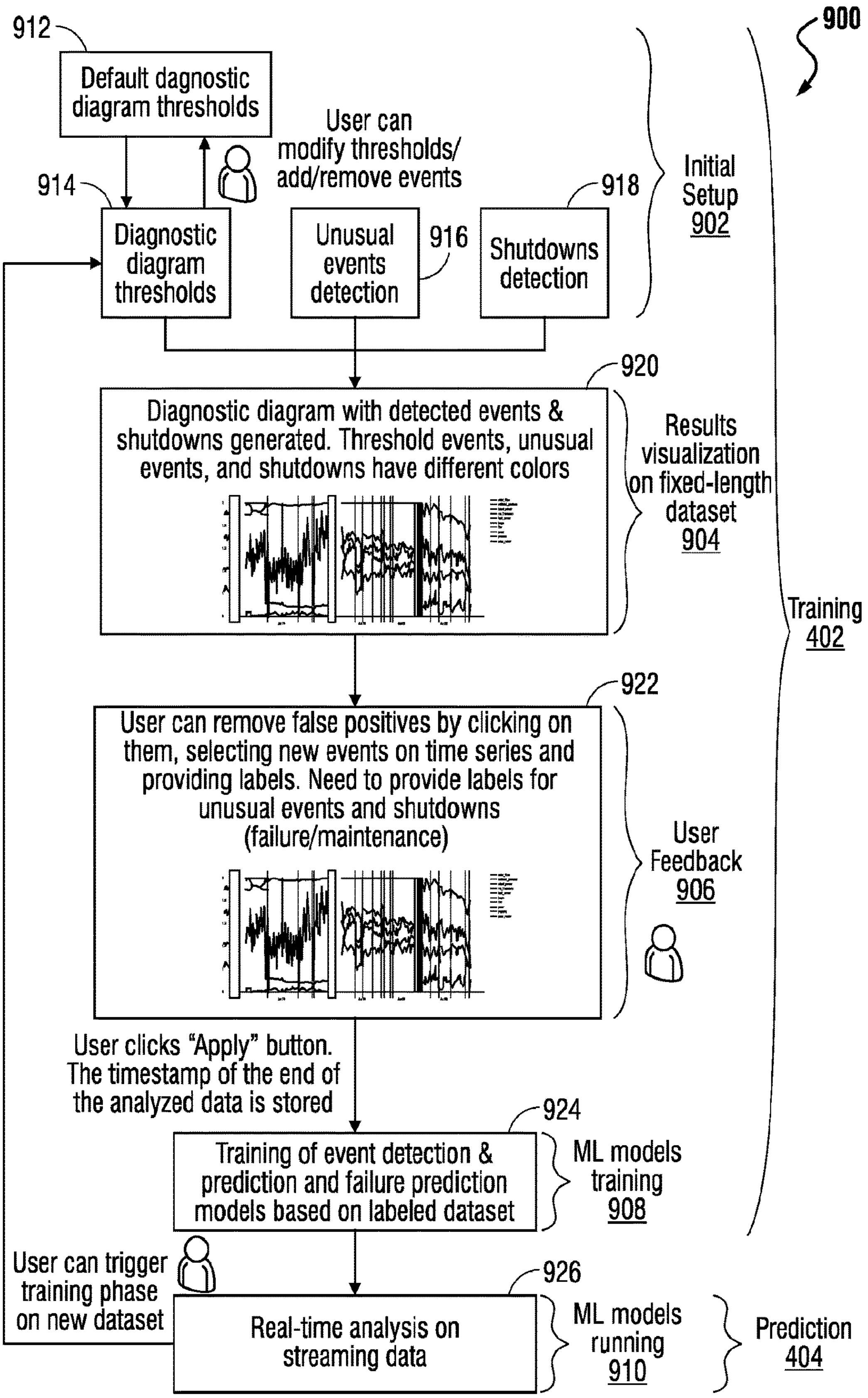
FIG. 9 is a flow diagram depicting exemplary operational phases for diagram-based event detection at a well site edge device according to embodiments of the present disclosure.

FIG. 9 is a flow diagram 900 illustrating the operational phases for the ML models 224 from FIG. 4 in more detail according to embodiments of the present disclosure. Here, the training phase 402 and the prediction phase 404 are shown in functional blocks, with the training phase 402 broken down into several smaller steps, including an initial set up step 902, a visualization step 904, a user feedback and modification step 906, and a model training step 908. The prediction phase 404 primarily includes running the ML models 224 to provide real-time analysis and detection or prediction of events (i.e., failure prediction), step 910.

The initial set up step 902 mainly involves preprocessing, including labeling, of the training datasets that are to be used to train the ML models 224 for event detection or prediction. This initial set up begins by using a default set of diagram-based slope thresholds 912 from one or more historical datasets as a starting point. In some embodiments, the initial slope thresholds are stored in a table similar to the one depicted in FIG. 12. Such a table is sometimes colloquially referred to as a "diagnostic diagram" because the slopes in the table are (or can be) derived from the diagrams used to graphically display the various well operational parameters (including ESP parameters). In some embodiments, a user may modify the thresholds and add or remove events during the initial set up before training begins. The resulting thresholds 914 are then stored as updates to the table or diagnostic diagram. Specific thresholds reflecting unusual events 916 and shutdowns 918 from previous detections may also be added to the correlation database at this time.

Next, at the visualization step 904, a diagnostic diagram 920 is generated for a portion or some fixed length of a dataset, which may be the entire dataset, showing the detected events and shutdowns detections. In some embodiments, threshold events (i.e., events that correspond to the thresholds), unusual events and shutdowns may be shown in different colors.

At the user feedback step 906, the user can label the thresholds and modify any thresholds on the diagnostic diagram as the user deems appropriate, resulting in a modified diagnostic diagram 922. For example, the user can add or remove an event, such as removing false positives, by clicking on the event and modifying the event, including by providing a new label for the event. Any unusual events 916 and shutdowns 918 that were added can be labeled at this time. The user then clicks on an "Apply" button, where applicable, to apply the modifications, which also adds a timestamp to the file storing the data. Otherwise, the user can simply restart the monitoring and control application to have the user-provided modifications applied.

The model training step 908 begins once the training dataset is labeled. In this step, the labeled training dataset is used to train the ML models 224 on how to perform event detection and prediction in the manner detailed above with respect to FIG. 4. Once the ML models 224 are trained and verified, the model running step 910 may be performed by deploying the ML models 224 to the edge gateway 138 for real-time event detection or prediction, as shown in FIG. 10.

Figure 10:
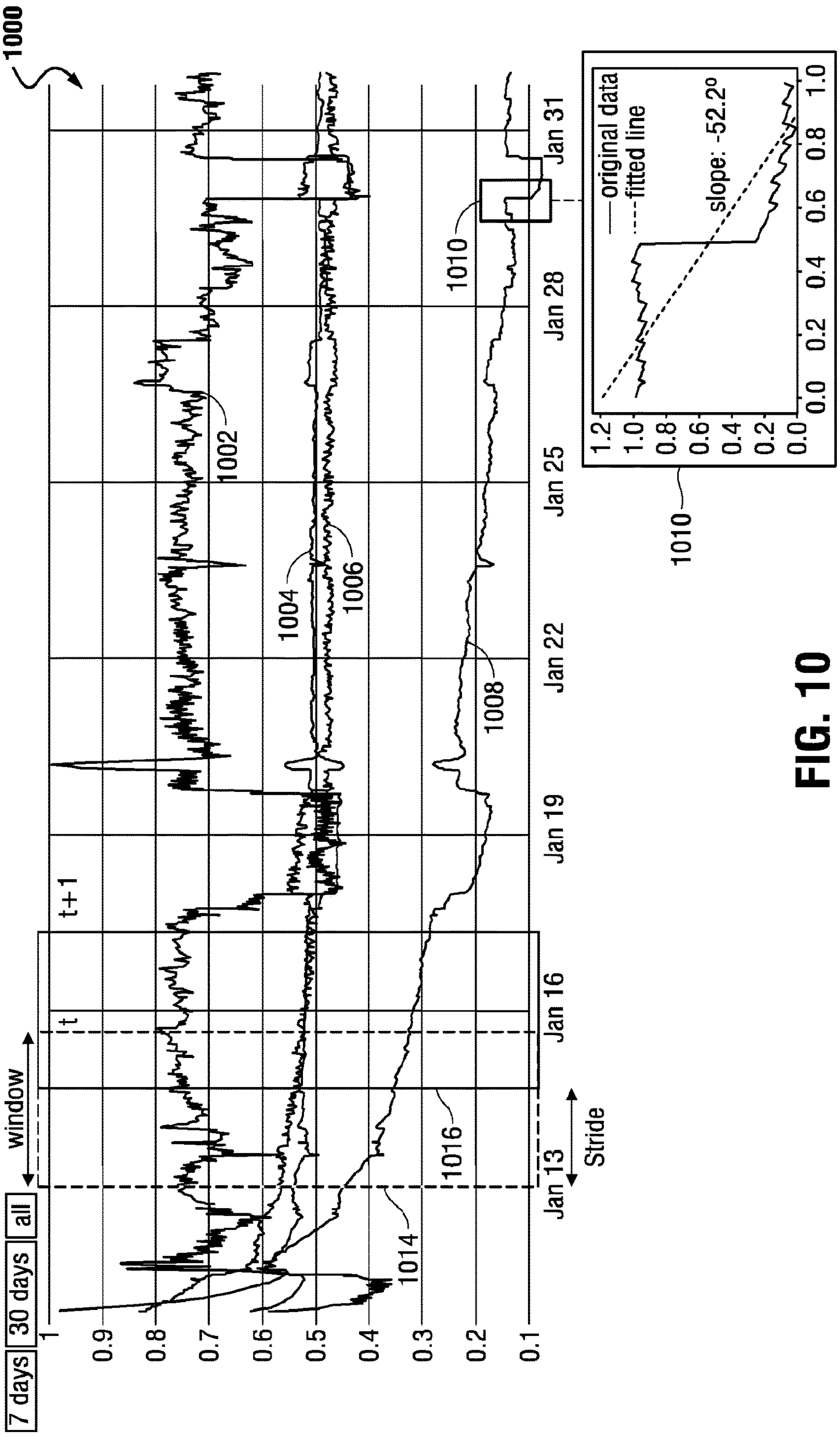
FIG. 10 is a graph showing an exemplary event detection using a time window at a well site edge device according to embodiments of the present disclosure.

FIG. 10 graphically depicts a method of using a sliding time window that the edge gateway 138 at the well site can perform to detect or predict events. The method involves the edge gateway 138 receiving data from or about the ESP 112, shown here in the form of a diagram 1000, in real time. The data may be streamed in real time to the edge gateway 138 in some embodiments, or it may be provided to the edge gateway 138 on a scheduled basis. There are several exemplary graph lines shown in the diagram 1000, each graph line representing an operational parameter related to the ESP, including wellhead pressure 1002, pump discharge pressure 1004, fluid flow rate 1006, and motor leakage current 1008. Upon receipt, the edge gateway 138 inputs these graph lines, or rather the data underlying the graph lines, to the ML models 224. The ML models 224 then process the data to detect events from the data patterns therein. As mentioned earlier, one way to detect events is by checking whether the slope of a given operational parameter or the slopes of a combination of operational parameters match any slope or combination of slopes in the diagnostic diagram. The slopes for the graph lines may be determined by fitting line segments to the graph lines using curve fitting techniques, then determining the slope of the line segments. Box 1010 shows an example of a line segment 1012 that has been fitted to a portion of graph line 1008. The slope of line segment 1012 may be expressed in degrees (e.g., −52.2 degrees) or as a ratio of vertical distance over horizontal distance. The ML models 224 thereafter check the slopes from each graph line or a combination of graph lines to identify patterns that indicate current occurrence of an event (e.g., solid/sand intake, gas intake, pump wear and tear, hole in tubing, motor/cable degradation, open choke, etc.) or occurrence within a certain amount of time.

In some embodiments, the event detection or prediction is performed on a stepwise basis with respect to the data, as mentioned earlier. This can be seen in the form of a time window 1014 starting at time t, a second time window 1016 starting at time t+1, and so on. Slope determinations may then be performed for each graph line on a per window basis (i.e., one slope determination per window), or multiple slopes may be determined for a given graph line within a given window and then mathematically combined (e.g., averaged), depending on the frequency with which the data changes. The time windows preferably have a uniform size (indicated by the label "window") and are preferably incremented in uniform steps (indicated by the label "stride"). The window size and incremental steps may be selected as needed for particular application and may be on the order of seconds, minutes, hours, or days. In some embodiments, it is also possible to use window sizes and incremental steps that are based on a certain number of data points (e.g., for low resolution data) instead of time intervals.

Figure 11:
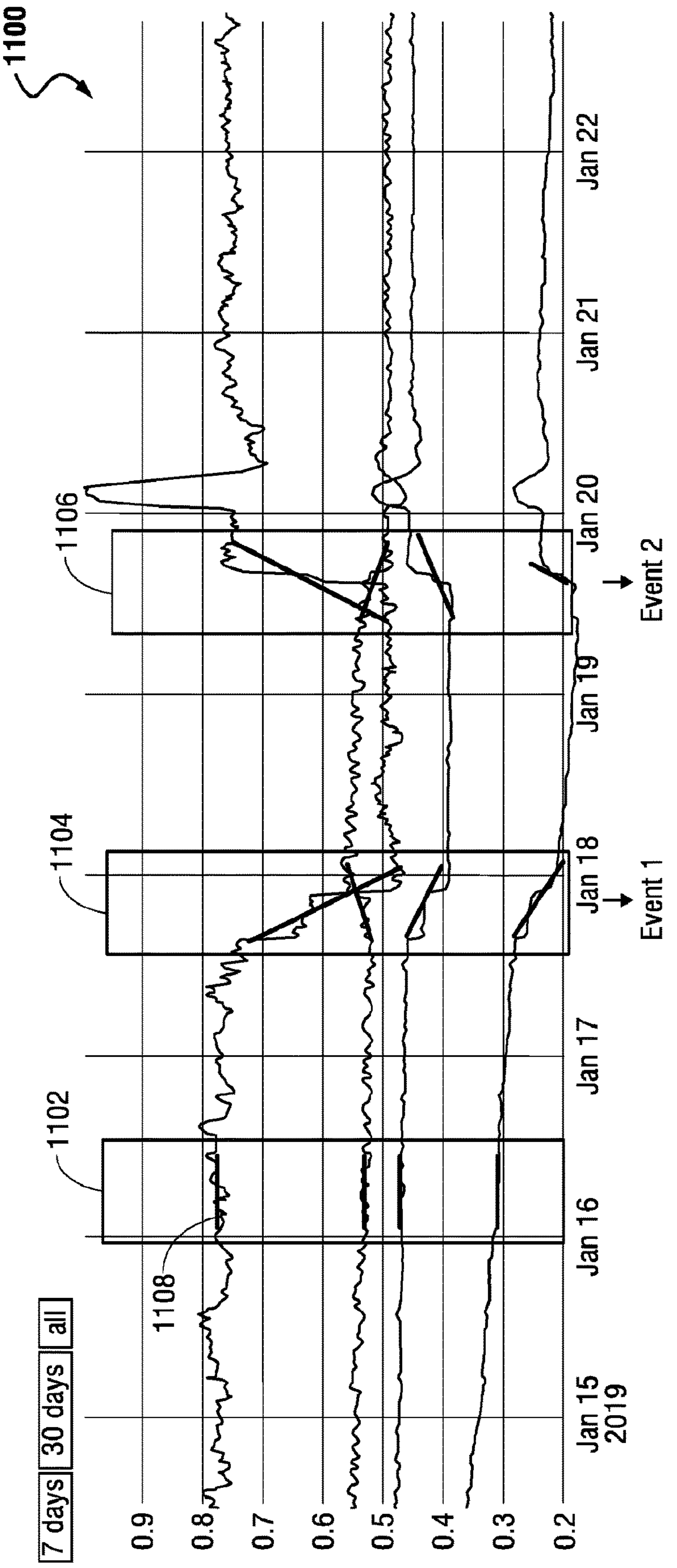
FIG. 11 is a graph showing exemplary diagram-based event detection at a well site edge device according to embodiments of the present disclosure.

FIG. 11 is another diagram 1100 graphically depicting in more detail the real-time event detection or prediction method performed by the edge device 138 using the ML models 224. There are several time windows in this view, indicated at 1102, 1104, and 1106. The slopes determined by the ML models 224 are represented by line segments, one of which is indicated at 1108, for each graph line within each window. Different slopes or slope combinations for each window 1102, 1104, and 1106 are then compared against the thresholds in the diagnostic diagram (see, e.g., FIG. 12) to perform event detection or prediction. In the first window 1102, for example, the slopes for each graph line are relatively flat and therefore do not meet or exceed any of the thresholds in the diagnostic diagram. The slope combination in the second window 1104, on the other hand, indicates a high probability that Event 1 (e.g., open choke) will occur within a given amount of time, while the slope combination in the third window 1106 indicates a high probability that Event 2 (e.g., blocked pump discharge) will occur within a given amount of time.

FIG. 12 is a table 1200 illustrating exemplary diagram diagnostic thresholds (or portion thereof) that may be inputted (see FIG. 9 at 914) and used by diagram-based ML models 224 to perform event detection or prediction according to some embodiments. These threshold slopes, such as the one indicated as 1202, are considered to be strongly indicative of or associated with certain types of known events, such as those listed in column 1204, based on work previously done in the field and/or results previously published from real-world well site data. It is possible and perhaps expected in some instances that one or more slope thresholds in table 1200 may coincide with or overlap one or more slope thresholds from the correlation database 800 in FIG. 8. These slope thresholds 1202 may be modified from time to time as needed by a user.

The table 1200 in this example also includes a time window column 1206 showing time windows within which the event is preferably detect or predicted, and the operational parameters relevant to the event detection or prediction. Thus, for example, a broken shaft event is preferably predicted within either a 6-hour window or a 12-hour window. The operational parameters in this example include flow rate 1208, wellhead pressure 1210, pump discharge pressure 1212, pump intake pressure 1214, and motor speed 1216. Other parameters may of course be included within the scope of the present disclosure. In this example, the ML models 224 will detect a broken shaft event if the slopes of the underlying data go beyond the (minimum or maximum) slopes listed in the operational parameters 1208-1216 (e.g., −20, −20, −20, 20, and 0), or certain combinations thereof, within a 6-hour or a 12-hour time window. In some embodiments, rather than use specific numerical values (e.g., degrees, ratios, etc.) for the slopes, it is possible to use a range for the slopes, such as −10 to −20, or to apply a descriptive category to the slopes, such as "stable," "slightly decreasing," "slightly increasing," "step increasing change," and the like.

Figure 13:
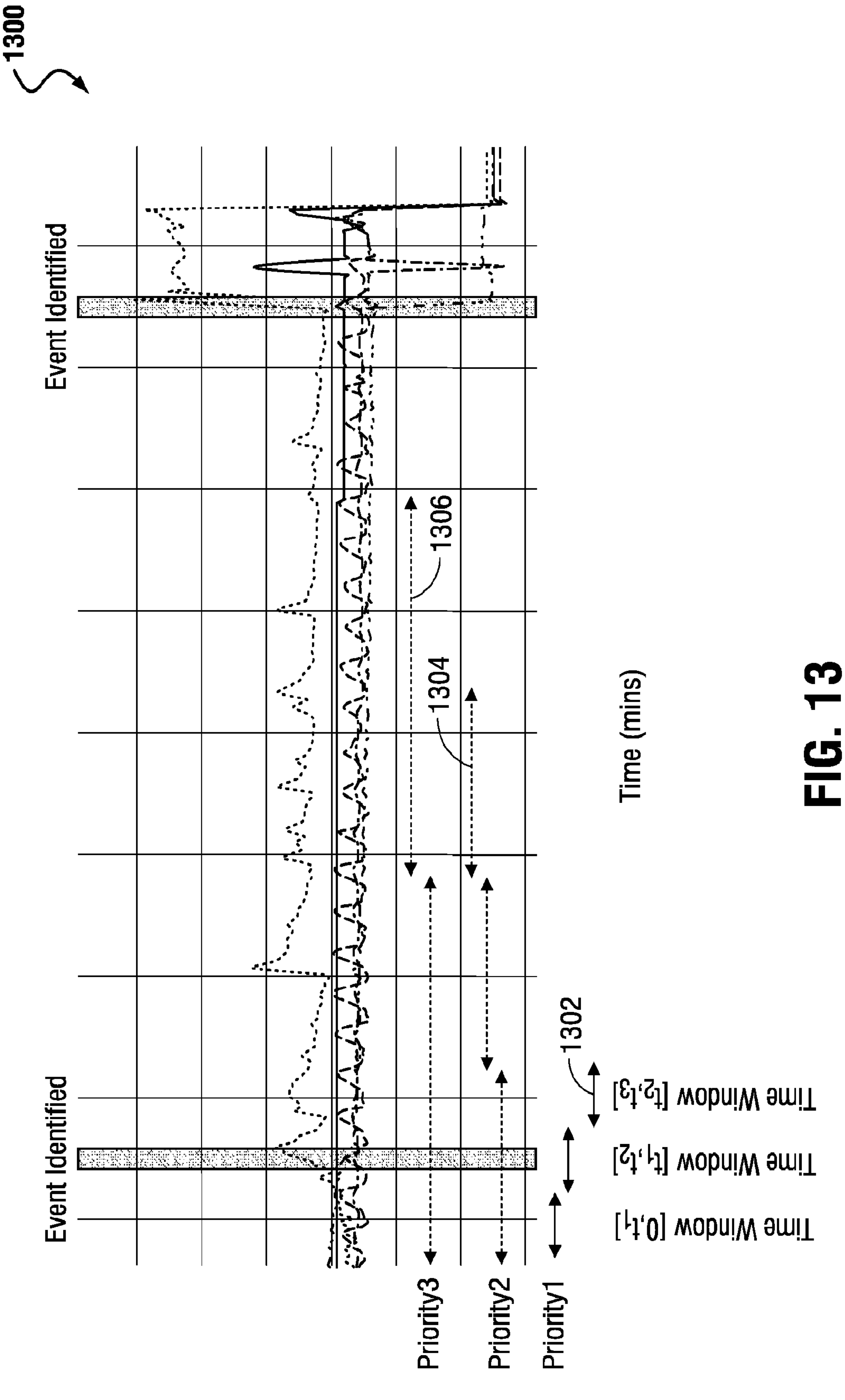
FIG. 13 is a graph showing an exemplary event detection using multiple time windows at a well site edge device according to embodiments of the present disclosure.

FIG. 13 is a diagram 1300 graphically illustrating a method of detecting events in which the ML models 224, both correlation-based and/or diagram-based, use several time windows, each having a different duration, according to some embodiments. The different durations allow detection or prediction of events having different priority or urgency. For example, the ML models 224 may use a time window 1302 having a shorter duration (e.g., 1 minute) to detect or predict high priority events or events that could lead to near-term failure. In contrast, the ML models 224 may use a second time window 1304 having a medium duration (e.g., 15 minutes) to detect or predict medium priority events or events that could lead to long-term failure. The ML models 224 may also use a third time window 1304 having a longer duration (e.g., one hour) to detect or predict all other events.

FIGS. 14A-14H show an exemplary user interface 1400 that may be used with the monitoring and control application 220 running on the edge device 138 according to embodiments of the present disclosure. The user interface 1400 allows an operator to monitor a well site in real time based on well operational parameters live-streamed to the edge device 138. The user interface 1400 may also be used for model training purposes by inputting historical datasets to the edge device 130 and letting the ML algorithms 224 learn from the data with operator feedback and adjustments to the data provided through the user interface.

Figure 14A:
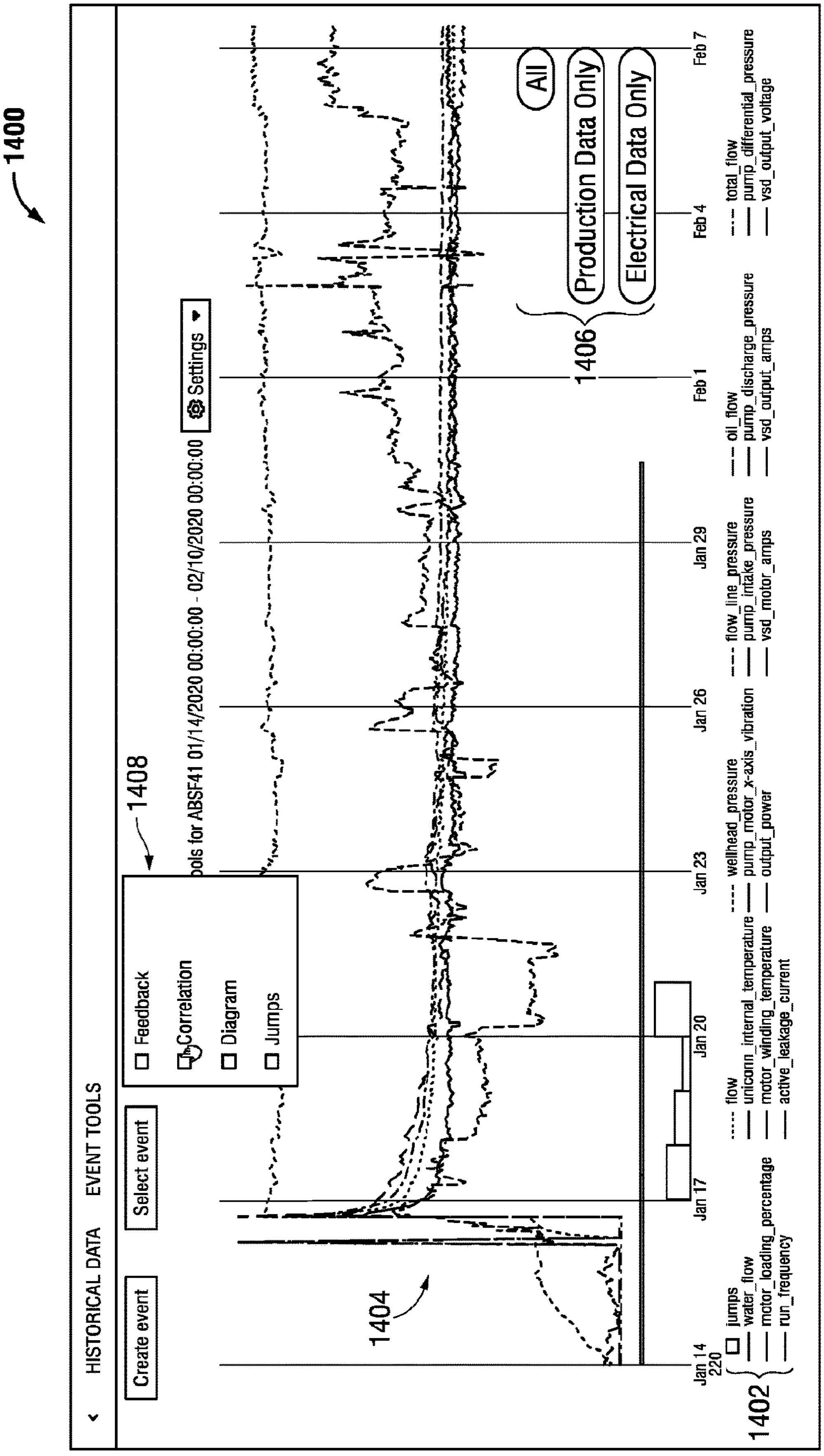
FIGS. 14A-14I are screen shots showing an exemplary user interface for monitoring event detections at a well site edge device according to embodiments of the present disclosure.

Referring first to FIG. 14A, well operational parameters (including ESP parameters) that are (or can be) received by the edge device 138 are listed by type at 1402. The operational parameters 1402 may be color-coded in some embodiments or otherwise visually differentiated to allow the operator to separately identify each parameter. It should of course be understood that other parameters known to those skilled in the art may also be used besides the ones shown at 1402. The user interface 1400 then graphically reproduces or otherwise displays these operational parameters at 1404. The time scale displayed in this example is in days, but a different time scale (e.g., minutes, hours, weeks, etc.) may certainly be used. A set of options, indicated at 1406, allows the user to select specific types of data to be displayed, such as production data, electrical data, and the like, and to hide unselected data. An event filter option 1408 allows the user to specify which type or types of events to display. In this example, the user may select from events that were detected via manual user feedback, correlation-based events, diagram-based events, jumps, and correlation check. Selecting correlation-based events causes the user interface 1400 to display events that were detected using correlation, as shown in FIG. 14B.

Figure 14B:
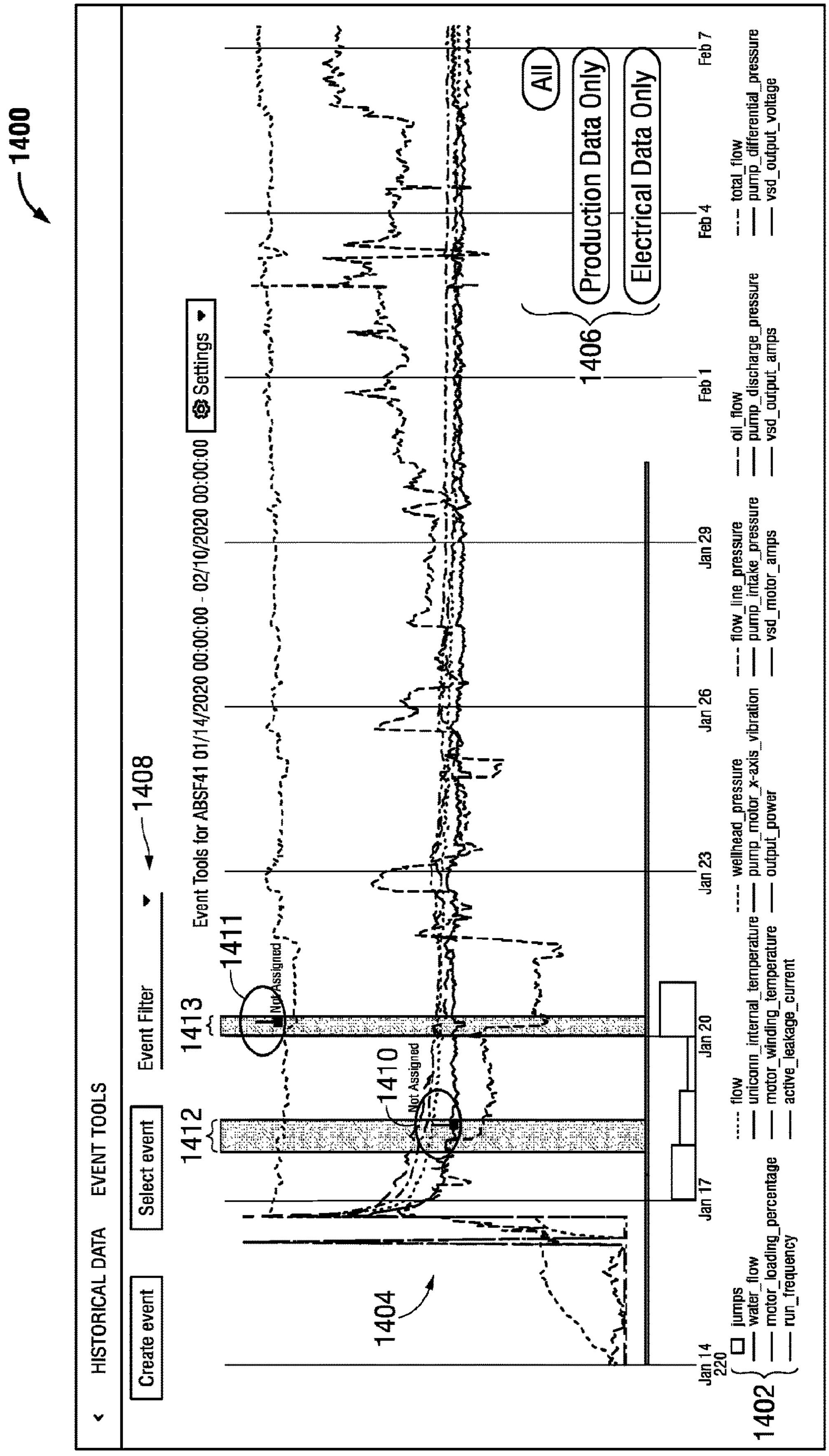

In FIG. 14B, the user interface 1400 displays two correlation-based events that were detected by the monitoring and control application 220 of the edge device 138 from the data, indicated at 1410 and 1411. The time windows 1412 and 1413 for the events 1410 and 1411 are also shown. In this example, the ML models 224 in the monitoring and control application 220 that are tasked with (trained for) detecting correlation-based events have detected abnormal or unusual behavior from the data within the time windows, but have not positively matched the behavior to known events in the correlation database, so the events 1410 and 1411 have been designated as "not assigned."

Figure 14C:
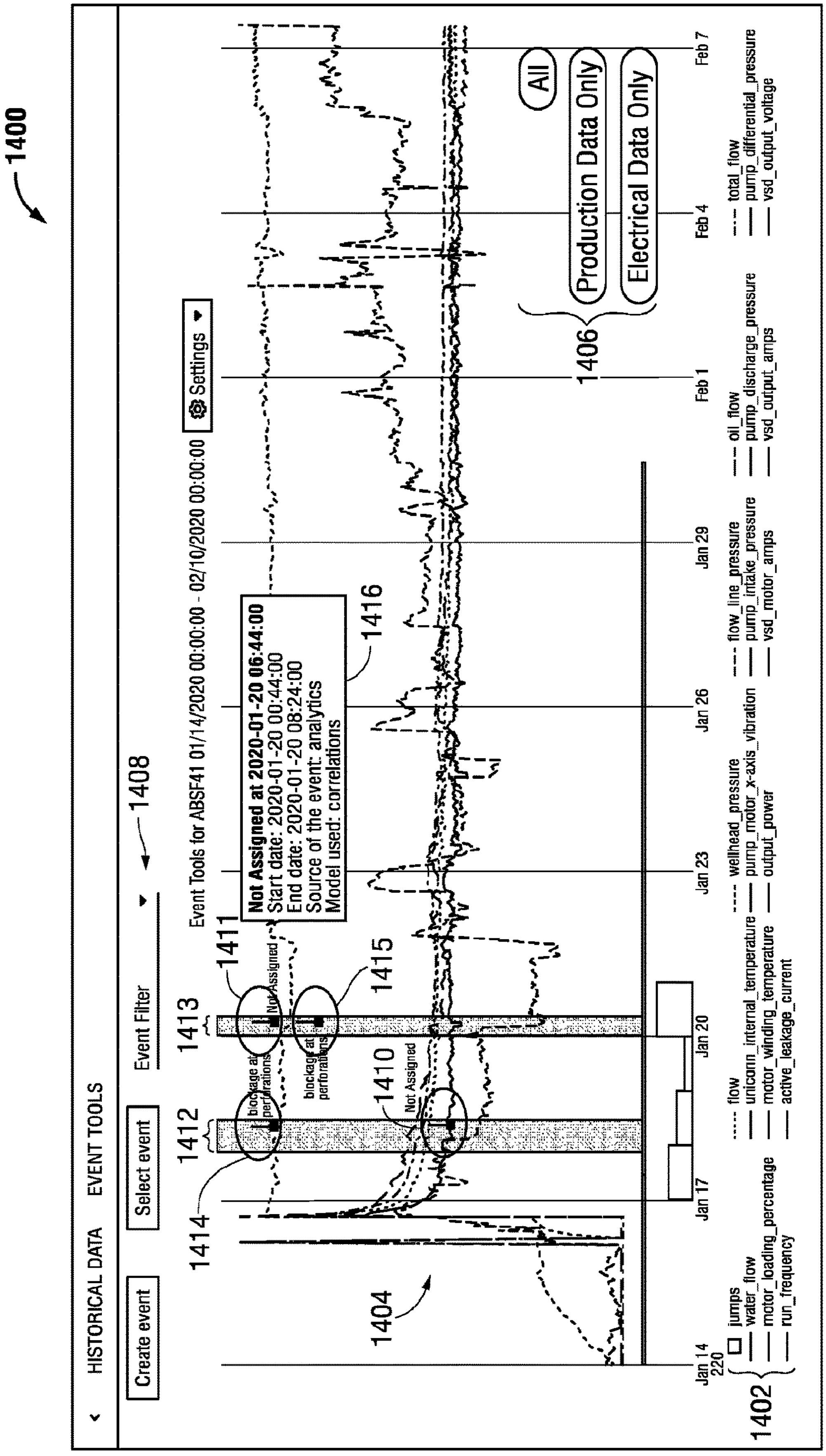

FIG. 14C shows an example where the operator additionally selected diagram-based events from the event filter 1408. As can be seen, the user interface 1400 now displays two diagram-based events 1414 and 1415 along with the two correlation-based events 1410 and 1411 from the previous figure. When an event is detected by both diagram-based and correlation-based models within the same or overlapping time windows, then this indicates there is a high probability that the event is real (i.e., not a false positive). The ML models 224 in the monitoring and control application that are tasked with (trained for) detecting diagram-based events have positively identified the same abnormal or unusual behavior from the data as a perforation blockage (i.e., the perforated holes in the tubing are obstructed, thus preventing fluid from freely moving through the holes). Note that clicking on or hovering a cursor over any of the events brings up a pop-up box 1416 that displays additional details about the event, such as start and end date/time, source of the data, ML model used to detect the event, and the like.

Figure 14D:
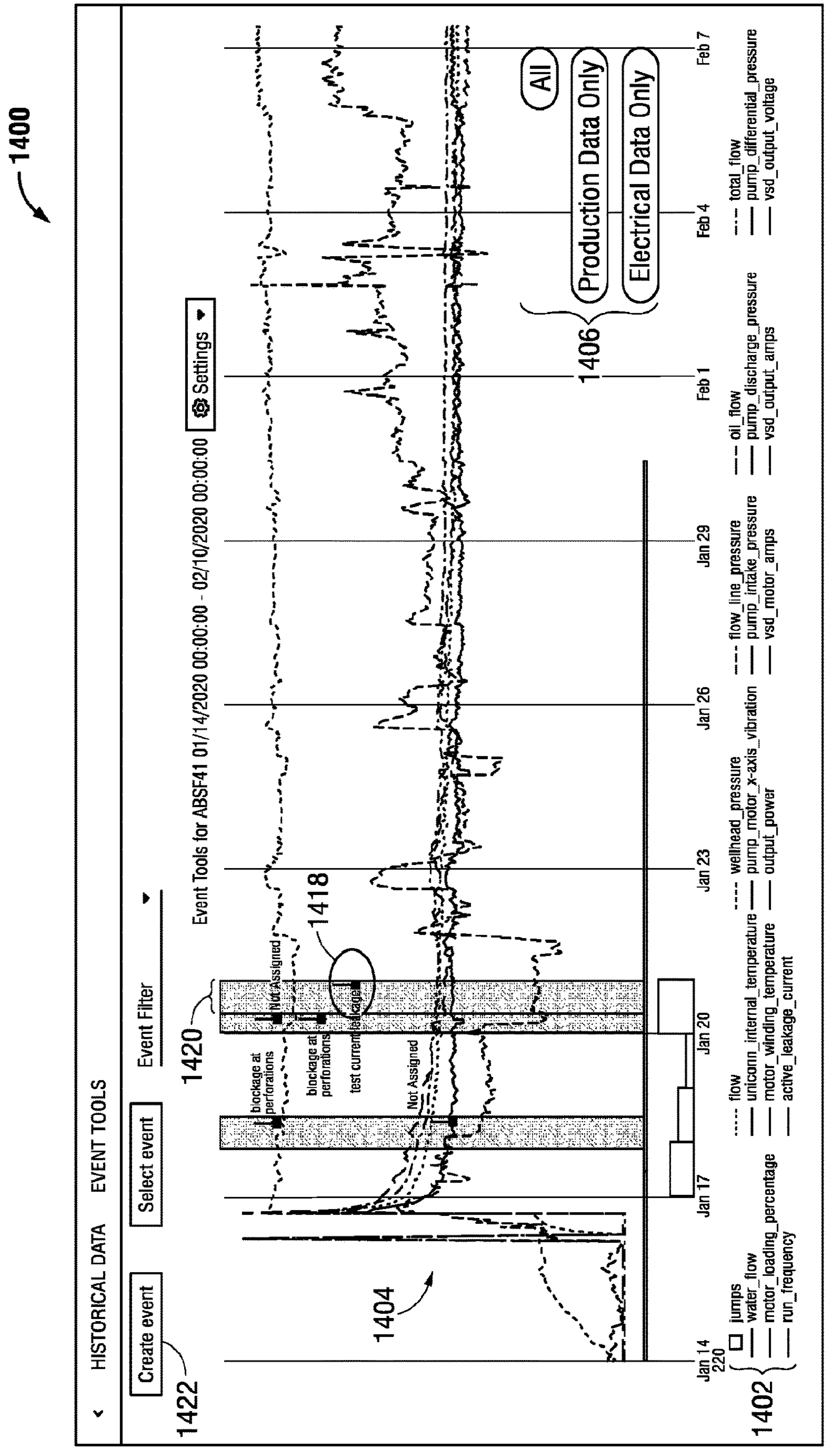

FIG. 14D shows an example where the operator additionally selected events that were identified through user feedback. One such event is displayed at 1418 along with the time window 1420 for the event. In some embodiments, each time window may have a different color or otherwise be visually distinguishable from other time windows for easy reference. A create event button 1422 allows the operator to manually create an event. This option is particularly useful when the operator knows or strongly suspects from a visual inspection of the data (e.g., based on previous experiences, etc.) that an event has or will soon occur, but neither the correlation-based ML models nor the diagram-based ML models has detected the event. In that case, the operator can click on the create event button 1422 to add an event, as shown in FIG. 14E.

Figure 14E:
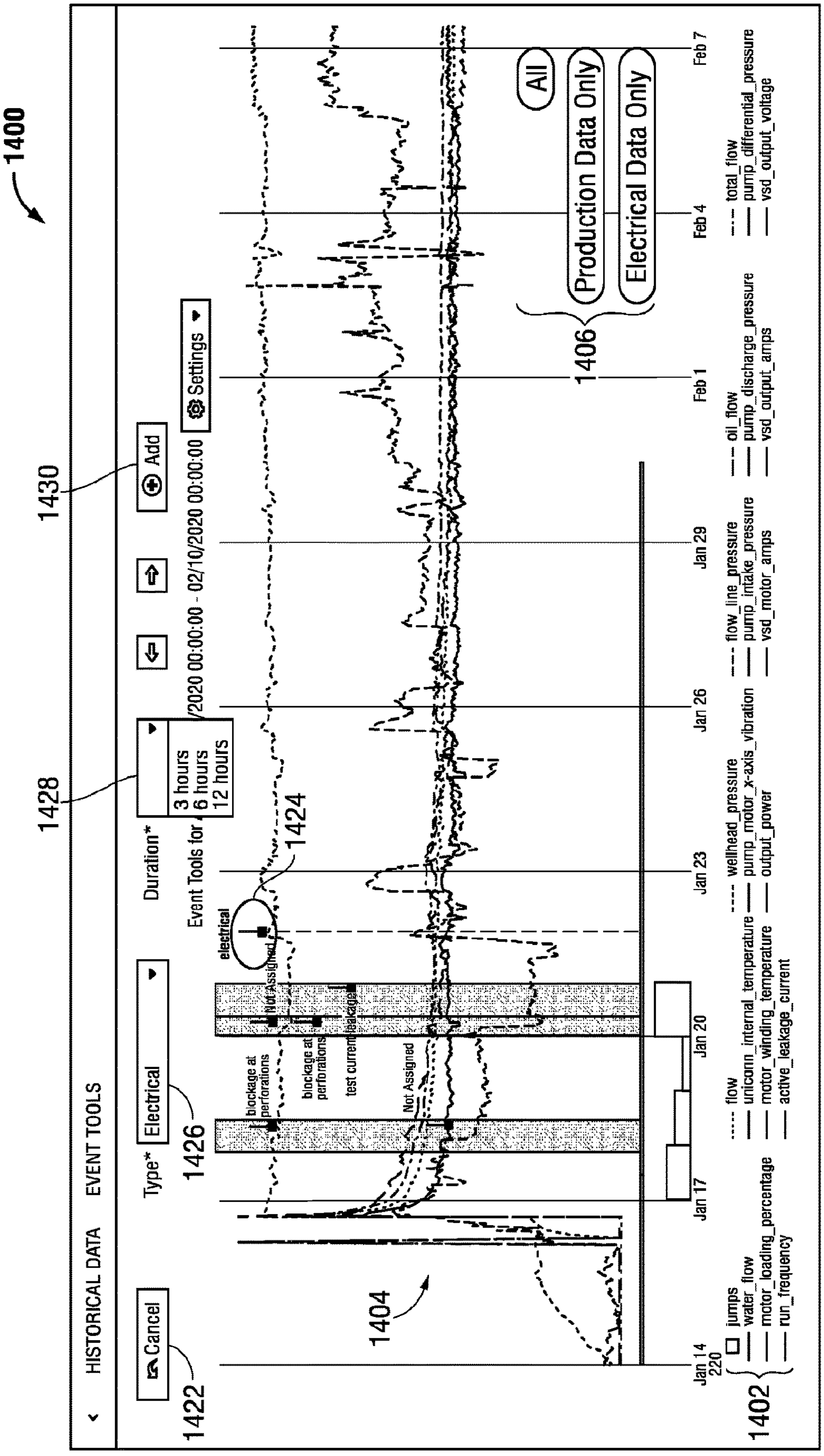

In FIG. 14E, the operator has selected a data point 1424 on one of the graph lines representing an operational parameter that the operator believes indicates an event. Choosing an event type option 1426 allows the operator to select the type of event, such as an electrical event. Choosing a time duration option 1428 allows the operator to select the time window for the event, such as 3 hours, 6 hours, 12 hours, and so forth. Choosing an add event option 1430 causes the user interface 1400 to add the selected data point 1424 as a user feedback event, as depicted in FIG. 14F.

Figure 14F:
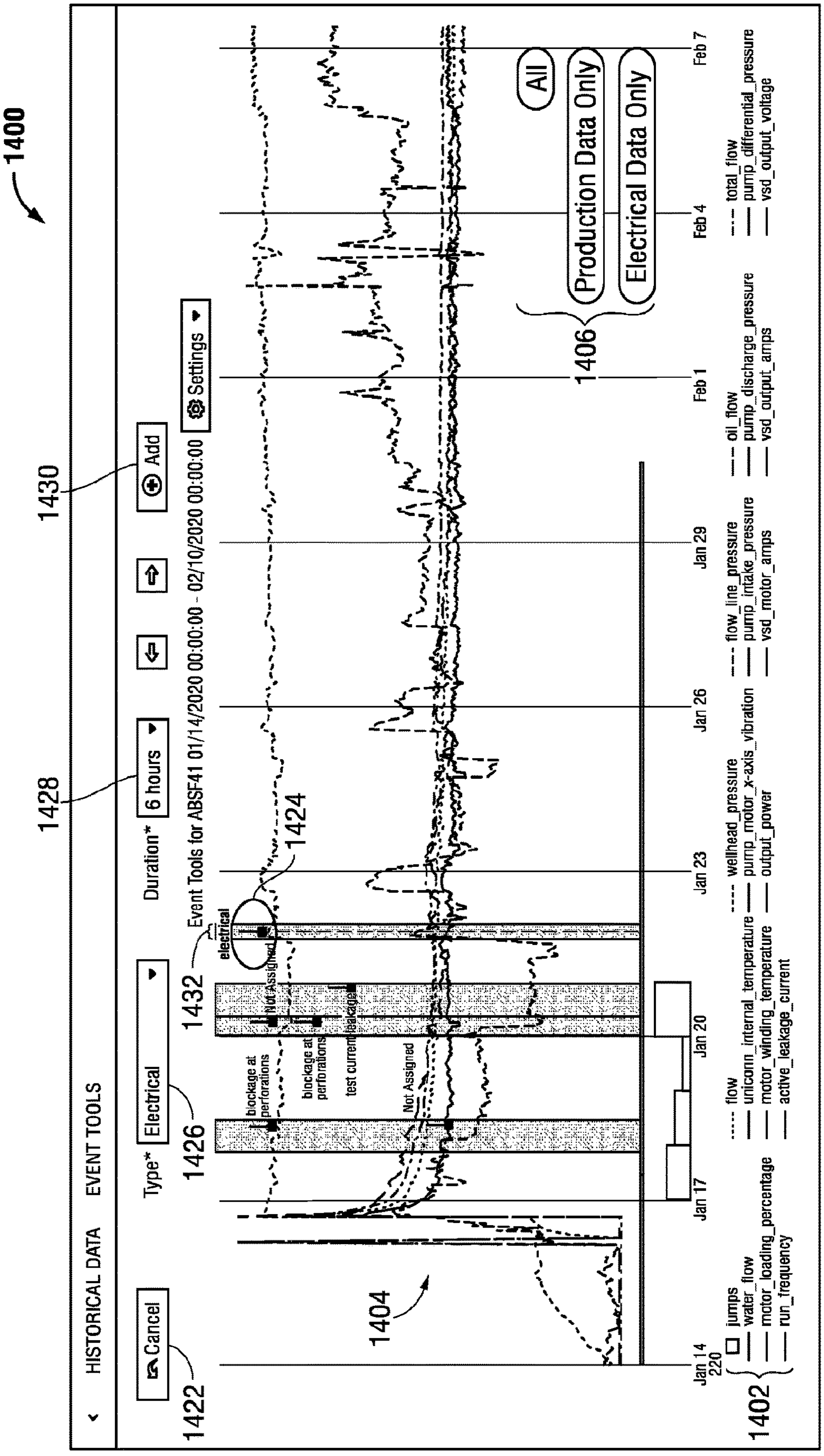

In FIG. 14F, the user interface 1400 now shows the selected data point 1424 as an electrical event 1424 having a 6-hour time window 1432 as selected by the operator. The user interface 1400 also automatically adds this user-created event 1424 to the database for the correlation-based models and the diagram-based models to be used by those models for future pattern recognitions. In addition to adding events, the operator can also modify any of the events by selecting that event and choosing an event type for that event, as depicted in FIG. 14G.

Figure 14G:
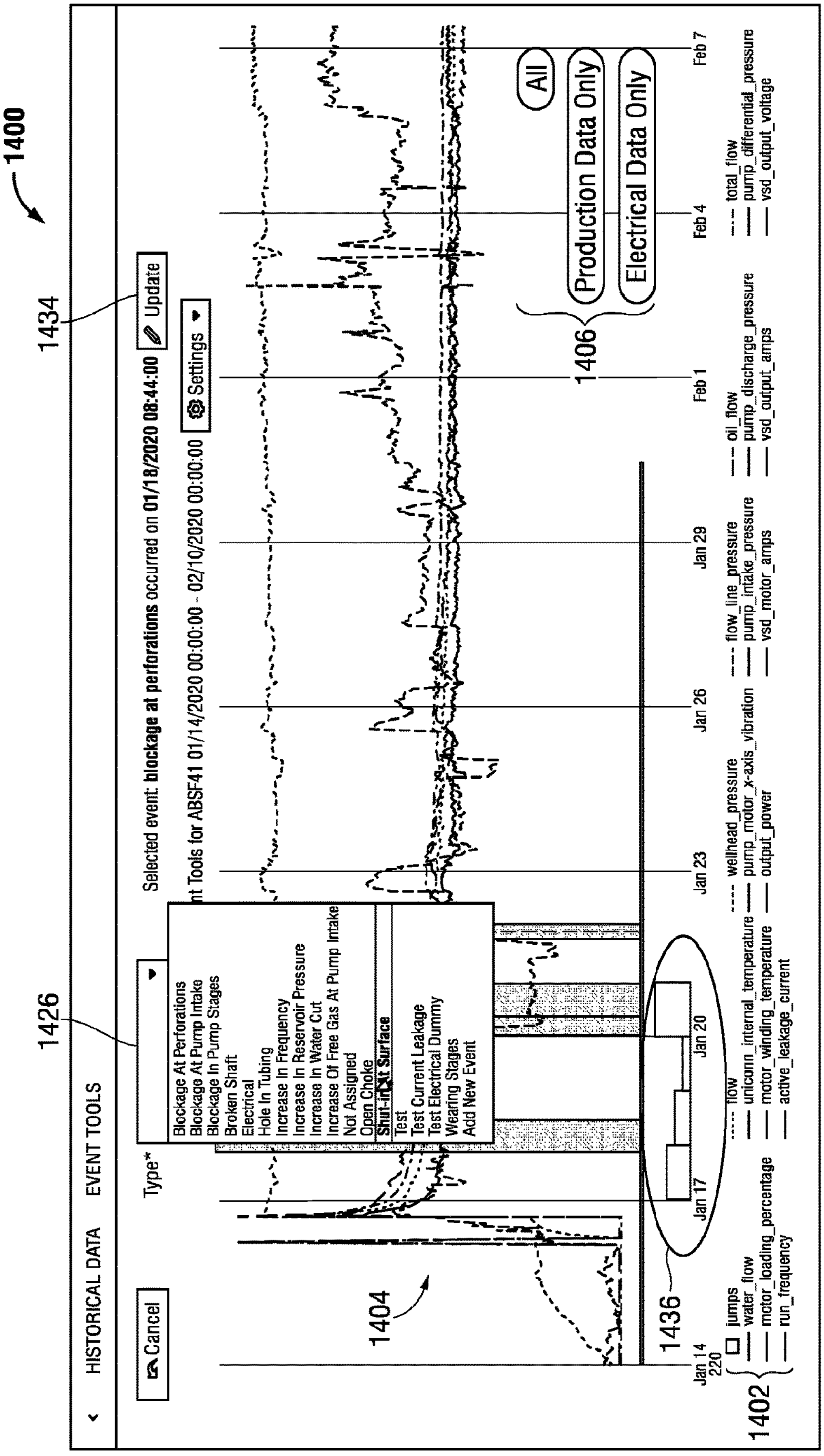

In the FIG. 14G example, the operator has selected one of the "not assigned" events (1410 and 1411) identified by the correlation-based models. Based on previous experiences, the operator knows or strongly suspects that the data underlying this event reflects a shut-in at the surface event (i.e., the well has been closed off at the surface). The operator can thus select the shut-in at surface type for this event to assign an event type to the event. The user interface 1400 thereafter causes the event type for that event to be changed to the selected type, and also updates the database for the ML models to reflect that the underlying data represents a shut-in at surface event. In this way, the operator can help improve the recognition accuracy of the models.

The user interface 1400 can also show "jump" type events. Recall from FIG. 14A that the event filter option 1408 allows the user to specify which type or types of events to display, including events that were detected via manual user feedback, correlation-based events, diagram-based events, and jumps. Jumps are basically variations between time steps in time series data, like the data representing the various well operational parameters 1402. Techniques for detection jumps are well known to those skilled in the art and may include, for example, open source libraries available from Arundo Analytics of Houston, Texas, USA. Such jumps may be visualized by the user interface 1400 as stacked bar graphs.

Referring again to FIG. 14G, a set of stacked bar charts are shown at 1436 representing jumps in the time series data for the well operational parameters 1402. In this example, each bar graph represents the number of jumps seen in a selected set of time series data for a given day. If the user selects a different set of time series data, the user interface 1400 updates the bar graphs 1436 to reflect the number of jumps seen the selected data. In general, the greater the number of jumps, the greater the probability of a detected event being real. Selecting (e.g., by double-clicking, tapping, etc.) one of the bar graphs causes the user interface 1400 to zoom in on the section of data reflected by the selected bar graph, as shown in FIG. 14H.

Figure 14H:
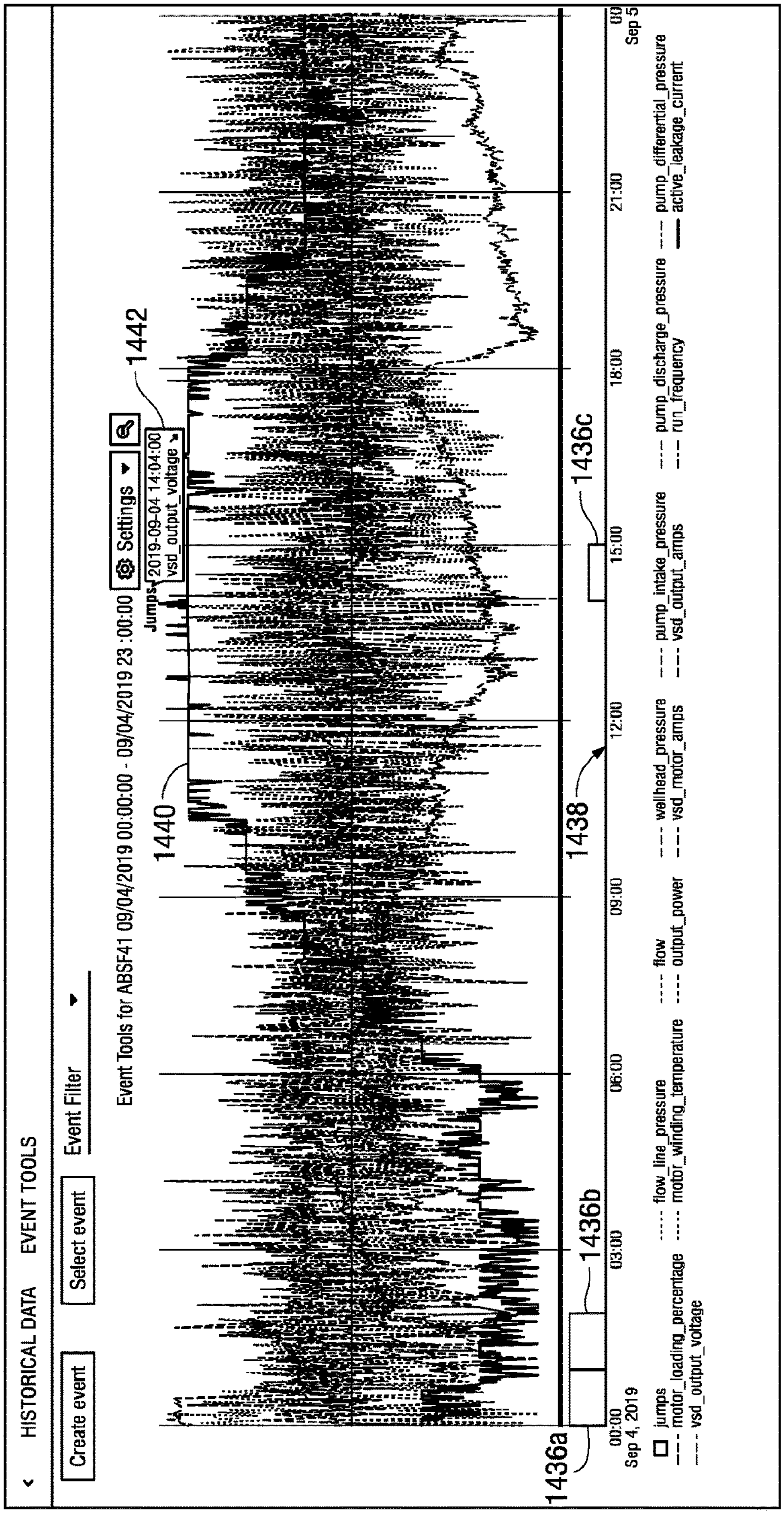

In the FIG. 14H example, the user interface 1400 has zoomed in on the data for a selected bar graph (e.g., like the one shown FIG. 14G), as evident by the smaller time scale 1438 (i.e., hours instead of days). From this view, the user can see that the selected jump contains three separate jumps, indicated at 1436*a-c*, that were stacked on top of one another. The user interface 1400 also displays a jump line 1440 that graphically represents the jumps in the data. Clicking on or hovering a cursor over any point along the line causes the user interface 1400 to display a pop-up box 1442 containing details underlying the jump, such as date/time, data type, and the like.

Figure 14I:
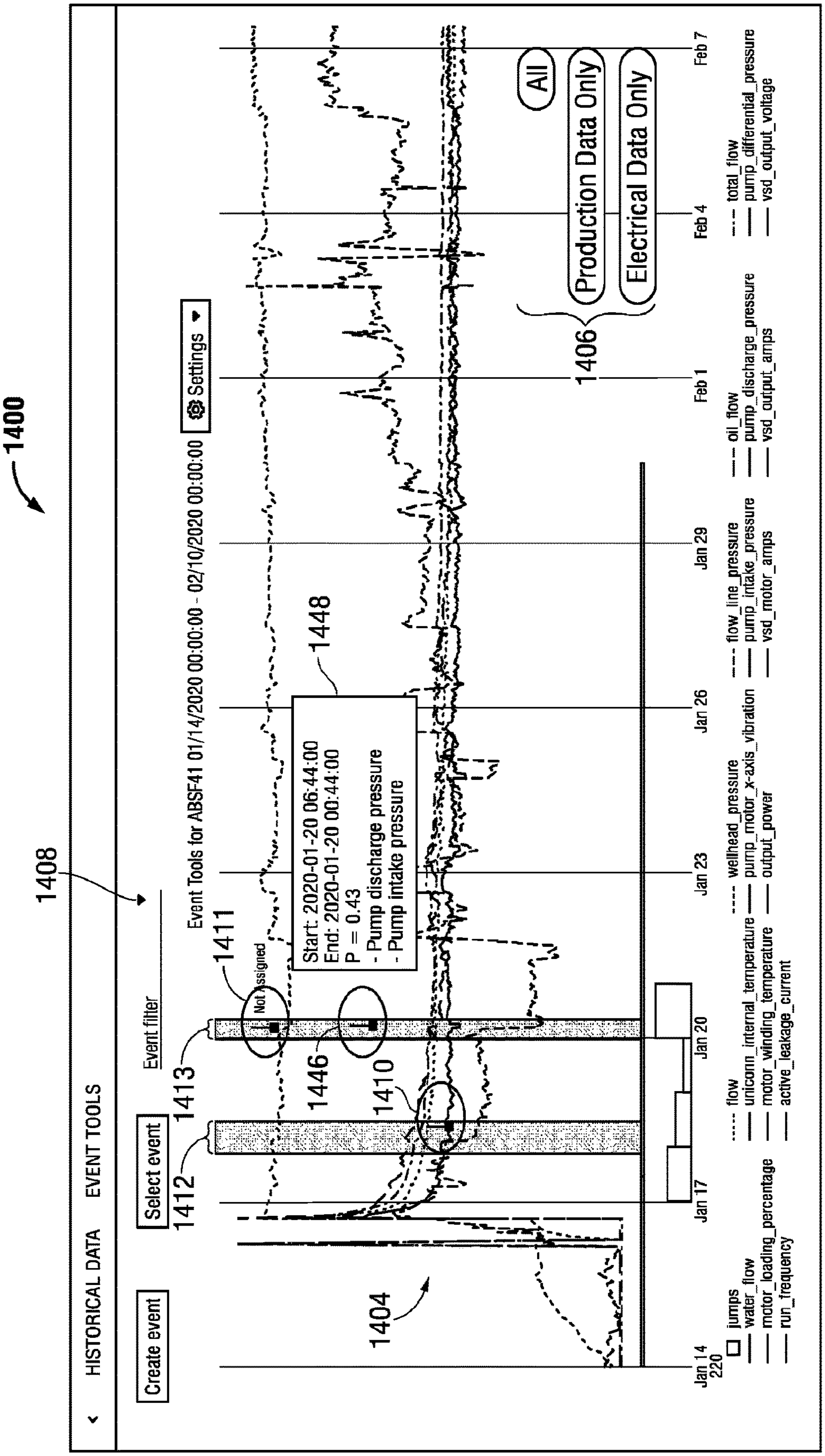

FIG. 14I shows an example of the user interface 1400 in which correlation checks have been selected from the event filter option 1408 in addition to correlation-based events. Correlation checks, sometimes referred to as "sanity" checks, can often serve as an indication of abnormal well operation. The correlation checks use the same correlation probabilities that are used to detect the correlation-based events in some embodiments. A correlation check generally proceeds by first determining whether the resultant probability vector $P=\langle P_{i,j}\rangle$ from Equation (3) has dropped below a certain preselected probability threshold. If yes, then a determination is made as to which pair of wellhead parameters is most responsible for causing the drop in P.

In some embodiments, determining the resultant probability vector P may be accomplished by mathematically combining the probability $P_{n,m}$ for each of the wellhead operational parameters. Recall from above that $P_{n,m}$ is the probability of a given slope for a wellhead parameter n as correlated to another, different wellhead parameter m (i.e., a correlated probability). These parameters may include the same parameters disclosed with regard to FIG. 7, for example, and the probabilities $P_{n,m}$ may be the same probabilities used with the correlation models to detect correlation-based events. In some embodiments, the probabilities $P_{n,m}$ for the various pairs of parameters are combined by averaging them over a certain time interval, such as 1 minute, 2 minutes, 5 minutes, 10 minutes, and so forth, to arrive at the probability vector P.

In some embodiments, determination of which pair of wellhead parameters is most responsible for causing P to drop below the preselected threshold may be accomplished by determining how many times a correlated probability from among the various correlated probabilities falls below the probability vector P (which may be an average of the correlated probabilities in some embodiments). Whichever correlated probability most frequently falls below the probability vector P is likely the one that is pulling down the P value. Thus, the pair of operational parameters for that correlated probability is likely the cause of the abnormal operation.

As can be seen in the FIG. 14I example, the monitoring and control application 220 has detected within the time window 1413 that the probability vector P has dropped below the preselected probability threshold. Accordingly, the monitoring and control application 220 provides a visual indication of this event at 1446 on the user interface 1400 to notify the operator that abnormal operation is likely taking place. The operator can obtain additional details about this event by hovering the cursor or clicking on the event. Doing so causes a pop-up box 1448 to appear on the user interface 1400 that displays additional details about the event, such as the start and end time encompassed by the time window 1413, the value of the probability vector P, and the pair of wellhead parameters that is most responsible for causing the probability vector P to drop below the preselected threshold.

In this example, the pair of parameters responsible for the drop in the probability vector P are the pump discharge pressure and the pump intake pressure. The monitoring and control application 220 can then take corrective action accordingly to resolve the problem with these parameters. Additionally, or alternatively, the operator can take corrective actions accordingly to resolve the problem with these parameters.

Figure 15A:
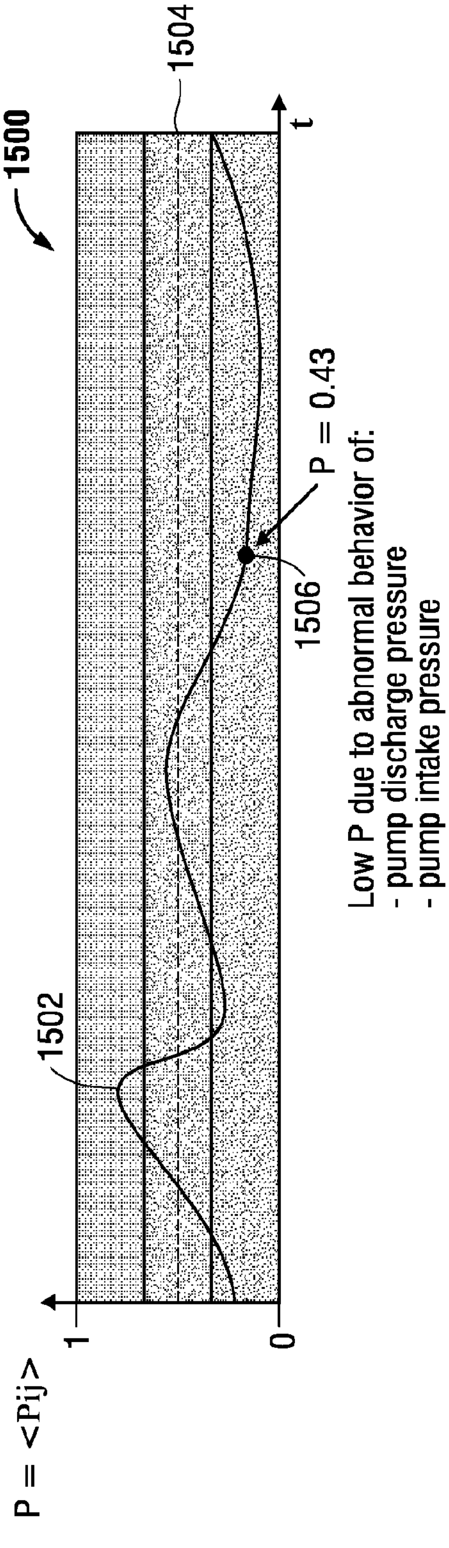
FIGS. 15A-15C are graphs showing exemplary correlation checks that may be used for event detections at a well site edge device.

FIG. 15A graphically illustrates the correlation check discussed above with respect to FIG. 14I in the form of a graph 1500. In the graph 1500, the vertical axis represents probability normalized from 0 to 1 and the horizontal axis represents time (t). Line 1502 represents the values of the resultant probability vector $P=<P_{i,j}>$. In this example, the values of the resultant probability vector P is derived by taking a running average of the values of the correlated probabilities $P_{n,m}$ for the various pairs of parameters over a time interval spanning the previous 5 minutes. Line 1504 represents a preselected threshold probability value, which is 0.50 in this example. Those having ordinary skill in the art will appreciate that other threshold values besides the threshold value shown here may be used.

As can be seen, the resultant probability vector P drops below the threshold probability value 0.50 at several points along line 1502, including at 1506, where the value is 0.43. When this drop occurs, the monitoring and control application 220 displays an indicator on the user interface 1400 (assuming the appropriate filter option is selected) to notify the operator of a likely abnormal operation. When the operator hovers the cursor or clicks on the indicator, the monitoring and control application 220 displays a pop-up box (see FIG. 14I) showing additional details about the event, including the likely cause of the low value for the resultant probability vector. In some embodiments, the monitoring and control application 220 determines the cause low resultant probability value by determining which correlated probability most frequently falls below the average resultant probability value. The pair of operational parameters for whichever correlated probability most frequently falls below the probability vector P (which may be a running average of the correlated probabilities) is likely the cause of the abnormal operation.

Figure 15B:
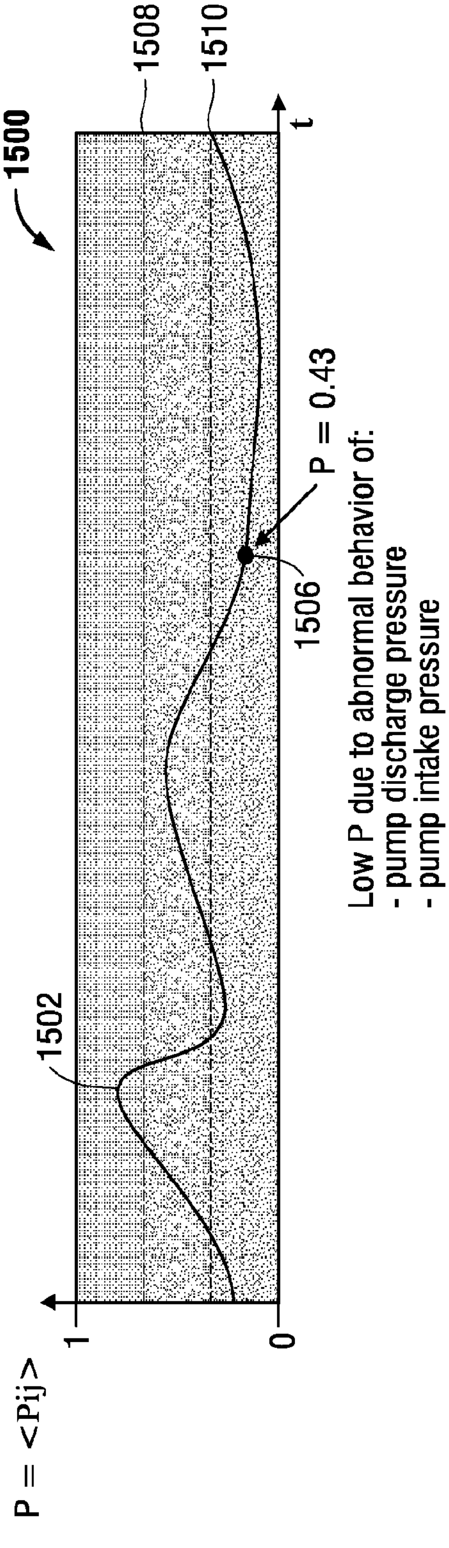

FIG. 15B graphically illustrates an alternative implementation of the correlation check discussed above. In this example, the graph 1500 once again includes a vertical axis that represents probability normalized from 0 to 1 and a horizontal axis that represents time (t). Line 1502 again represents the values of the resultant probability vector $P=<P_{i,j}>$. However, instead of a single preselected threshold probability value, several preselected threshold probability values may be used. In this example, there are two threshold probability values, a first or medium severity threshold probability value 1508, and a second or high severity threshold probability value 1510. The medium severity threshold probability value 1508 may be 0.66, for example, and the high severity threshold probability value 1510 may be 0.33. The monitoring and control application 220 displays a different indicator accordingly on the user interface 1400 when the resultant probability value falls below the medium severity threshold probability value 1508 versus the high severity threshold probability value 1510.

Figure 15C:
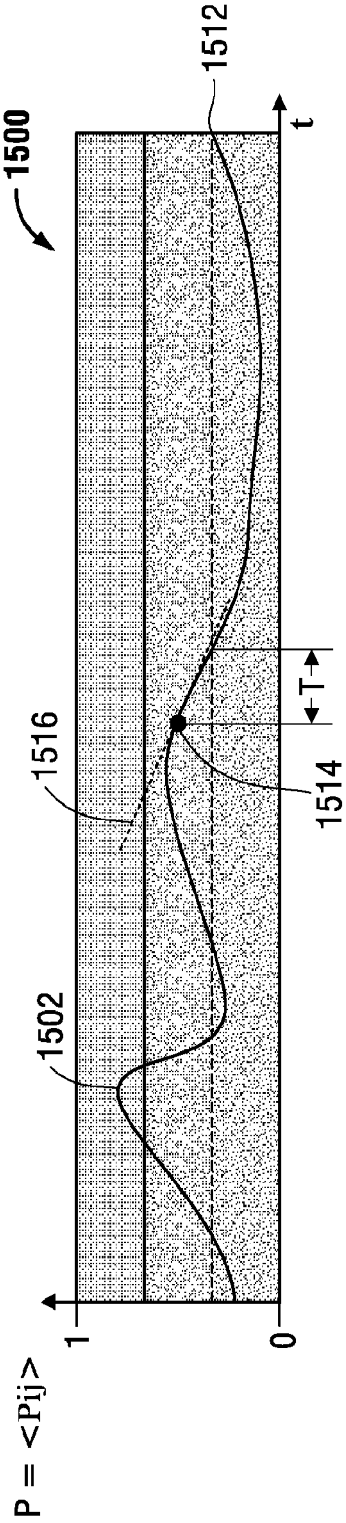

FIG. 15C graphically illustrates yet another alternative implementation of the correlation check discussed above. In this example, instead of (or in addition to) tracking the values of the resultant probability vector P, as represented by the graph 1500, the monitoring and control application 220 tracks how slowly or quickly the probability vector P trends toward a preselected threshold value 1512. The trend for the probability vector P may be tracked by determining, for a given point 1514 along the graph 1500, the slope 1516 of the graph at that point. Any suitable technique for determining the slope 1516 at a given point 1514 along the graph 1500 may be used (e.g., rise over run). The monitoring and control application 220 may then use the slope 1516 to estimate how much time T remaining until the probability vector P falls below the preselected threshold 1512 (indicating likely abnormal operation). If estimated remaining time T is less than a certain preselected minimum time (e.g., 1 minute, 5 minutes, 10 minutes, 1 hour, etc.), then the monitoring and control application 220 notifies an operator by displaying an event indicator and pop-up box on the user interface 1400 (see FIG. 14I). This allows the operator to take any anticipatory corrective action that may be needed. The monitoring and control application 220 may also take anticipatory corrective action as programmed based on how much estimated time T remains.

Figure 16:
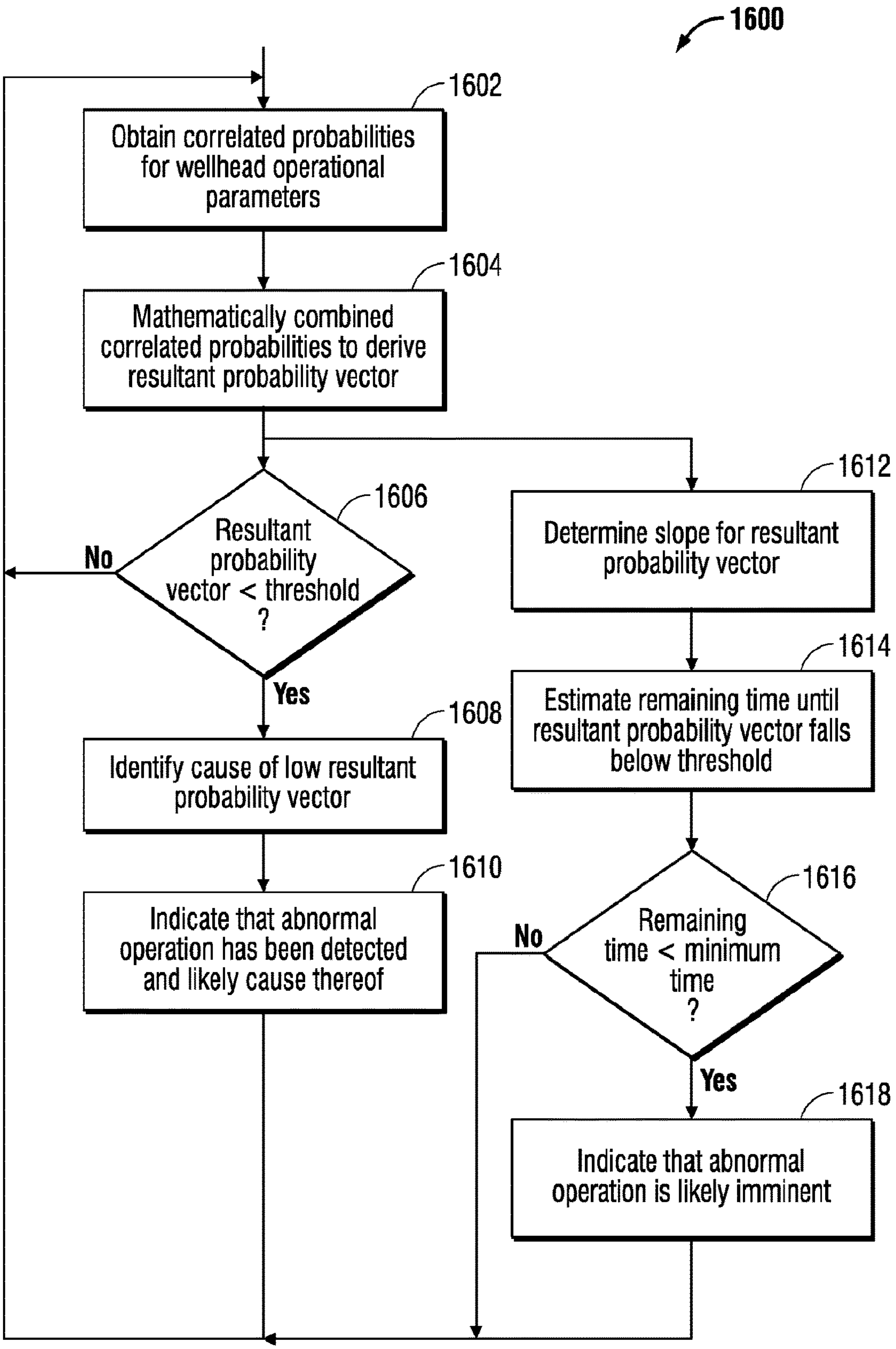
FIG. 16 is a flow diagram for an exemplary method that may be used to perform a correlation check at a well site edge device.

FIG. 16 shows a flowchart illustrating an exemplary method 1600 that may be used with monitoring and control application 220 to perform the correlation check discussed above according to some embodiments. The method begins at 1602 where correlated probabilities $P_{n,m}$ for the various wellhead operational parameters are obtained, for example, by using the same correlated probabilities (see FIG. 7) that are used for correlation based event detection. At 1604, the correlated probabilities $P_{n,m}$ for the various wellhead operational parameters are mathematically combined to derive a resultant probability vector $P=<P_{i,j}>$. In some embodiments, the resultant probability vector P may be derived by averaging the correlated probabilities $P_{n,m}$ over a certain time interval, such as 1 minute, 2 minutes, 5 minutes, 10 minutes, and so forth.

At 1606, a determination is made whether the resultant probability vector P is below a preselected probability threshold value. In some embodiments, the preselected probability threshold value may be 0.50. In some embodiments two or more probability threshold values may be used, such as a medium severity threshold value (e.g., 0.66) and a high severity threshold value (e.g., 0.33). If the determination is no, then the method returns to 1602 to obtain another set of correlated probabilities. If the determination at 1606 is yes, then the cause of the low resultant probability vector is identified at 1608. In some embodiments, identifying the cause of the low resultant probability vector P may be accomplished by determining which correlated probability from among the various correlated probabilities falls below that low probability vector P most frequently. Whichever correlated probability falls below the low probability vector P most frequently, the pair of operational parameters for that correlated probability is identified as the cause of the low resultant probability vector P. Once the parameters are identified, then at 1610, an indicator is displayed to indicate abnormal operation has been detected, along with the cause thereof.

In some embodiments, after deriving the resultant probability vector at 1604, the method 1600 may additionally (or alternatively) determine a slope for the resultant probability vector at 1612. Any suitable technique for determine the slope at a given point on a line may be used to determine the slope of the resultant probability vector. Based on the slope, an estimate may be obtained for the remaining time until the resultant probability vector falls below the probability threshold at 1614. At 1616, a determination is made whether the estimated time remaining is less than a preselected minimum time. If the determination is no, then the method returns to 1602 to obtain another set of correlated probabilities. If the determination at 1616 is yes, then an indicator is displayed (see FIG. 14I) to indicate to an operator that likely abnormal operation is imminent. The method thereafter returns to 1602 to obtain another set of correlated probabilities.

Figure 17:
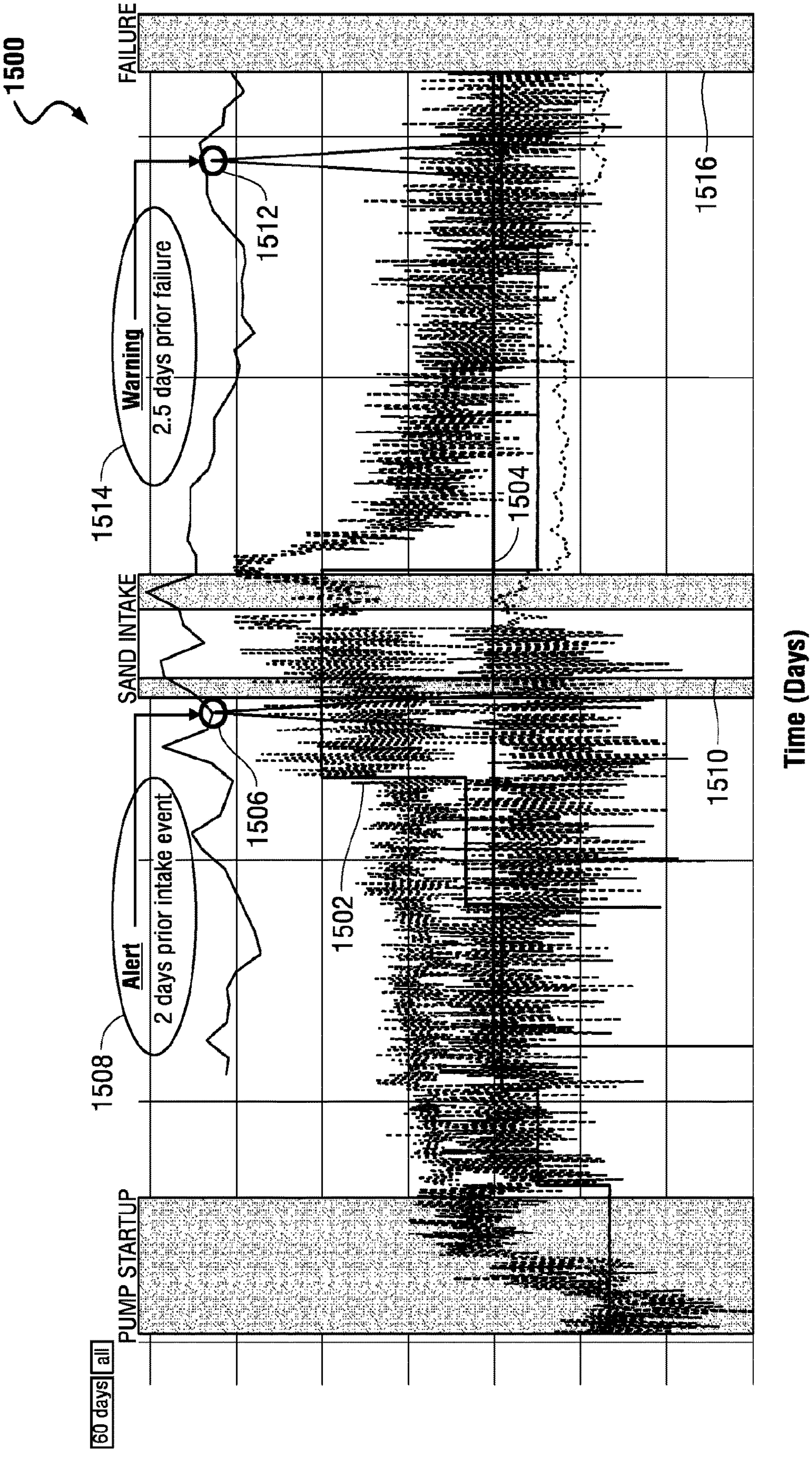
FIG. 17 is another screenshot showing an exemplary user interface for monitoring event detections at a well site edge device according to the present disclosure.

FIG. 17 is an alternative user interface 1700 for the monitoring and control application 220 of the edge gateway 138 that may be displayed to an operator. This user interface 1700 again presents the operator with a graphical visualization of the data 1702 being streamed from or about the ESP 112. The user interface 1700 also displays a probability line 1704 that indicates the likelihood of any events or failures detected by the ML models in the monitoring and control application 220. In general, the higher the probability line 1704, the greater the probability of the event occurring.

In the FIG. 17 example, the ML models 224 have detected a slope or combination of slopes in the streamed data 1702 that reflect occurrence of a sand intake event within approximately two days. This event is indicated by a peak 1706 in the probability line 1704 that is accompanied by an alert 1708 pointing out the event. The event is also shown as a shaded area 1710 in the user interface 1700. The ML models 224 have also detected a slope or combination of slopes in the streamed data 1702 that reflect occurrence of a failure event within approximately two and a half days. This event is indicated by a peak 1712 in the probability line 1704 that is accompanied by a warning 1714 pointing out the event. The event is also shown as a shaded area 1716 in the user interface 1700. The operator may then select either of these events or the alerts and warnings therefor to view the details (e.g., underlying data, slopes, etc.) for the events, as indicated in FIG. 18.

Figure 18:
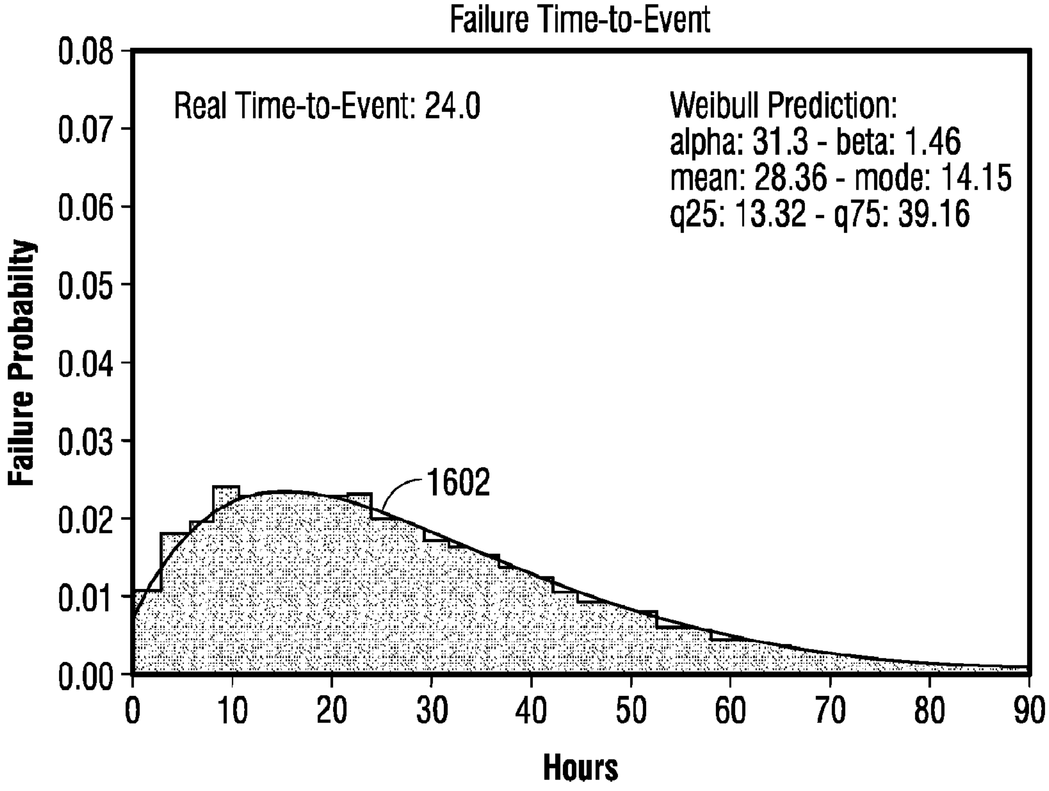
FIG. 18 is another screenshot showing a probability chart for event detection at a well site edge device according to embodiments of the present disclosure.

In FIG. 18, the operator has selected the event indicated at 1706, which causes the user interface 1700 to bring up a failure probability chart 1800 for the event. This failure probability chart 1800 presents the user with a graphical visualization of the probability of failure, indicated at line 1802, with respect to the time-to-event for the event 1706 detected by the ML models 224. From this chart 1800, the user can see the details of the failure probability spread out over time. Thus, in this example, the probability of failure is highest within the next 10 to 20 hours, and gradually decreases thereafter.

From the foregoing, it will be appreciated that an edge gateway with ML-based analytics as discussed herein can be deployed in a number of ways, including as a stand-alone on-premise solution where the edge gateway has no connectivity to a Cloud platform. This stand-alone solution integrates seamlessly with existing or new SCADA systems where feedback from the edge gateway can be used in a centralized manner to support real-time decisions that help improve operational efficiency. An on-premise solution is preferable where there is limited or no WAN connectivity, or where operators are hesitant to expose data on a cloud platform through a public Internet connection for data security purposes.

Alternatively, an edge gateway with ML-based analytics can take advantage of full cloud connectivity where multiple such gateways can be maintained and managed via a cloud platform. This option allows real-time data collected from multiple edge gateways to be used to retrain ML models, resulting in more accurate applications at the edge. This retraining process can be automated and retrained models can be deployed to multiple gateways based on a preset schedule, whenever model accuracy reaches a predefined level.

In the preceding discussion, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a private area network (PAN), local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. An edge device comprising:

a processor; and a storage device coupled to the processor and storing computer-readable instructions for a well site monitoring and control application thereon that, when executed by the processor, causes the edge device to:

provide an access or entry point for a remote programmable automation controller (PAC) at a well site to a field network that allows the PAC to communicate with a supervisory controller;

receive well site data from the PAC, the well site data representing one or more operational parameters related to well site operations;

derive a probability for a given slope for each one of the one or more operational parameters as correlated to a different one of the one or more operational parameters to produce correlated probabilities for the one or more operational parameters over a sliding time window in real time;

derive a resultant probability from the correlated probabilities over the sliding time window;

determine a slope for the resultant probability and estimate a time remaining until the resultant probability fails to meet a preselected threshold probability value based on the slope and that indicates an abnormal operation; and initiate a responsive action if the resultant probability fails to meet the preselected threshold probability value, wherein the responsive action includes at least one of a notification or a corrective action from at least one of the PAC or the supervisory controller to resolve the abnormal operation.

2. The edge device of claim 1, wherein the well site operations include pump operations performed by an electric semisubmersible pump (ESP) at the well site and the well site data includes data related to the pump operations by the ESP at the well site.

3. The edge device of claim 2, wherein the monitoring and control application causes the edge device to derive the resultant probability from the correlated probabilities by taking an average of the correlated probabilities over a predefined time interval.

4. The edge device of claim 3, wherein the predefined time interval has a duration between one minute and 10 minutes.

5. The edge device of claim 1, wherein the resultant probability fails to meet the preselected threshold probability value when the estimated time remaining is less than a predetermined minimum time.

6. The edge device of claim 5, wherein the monitoring and control application further causes the edge device to determine a correlated probability from among the correlated probabilities that most frequently falls below the average of the correlated probabilities, and identify operational parameters associated with the correlated probability as causing the resultant probability to fail to meet the preselected threshold probability value.

7. The edge device of claim 1, wherein the preselected threshold probability value is one of a first threshold probability value and a second threshold probability value.

8. A method comprising:

providing an access or entry point for a remote programmable automation controller (PAC) at a well site to a field network that allows the PAC to communicate with a supervisory controller;

receiving well site data from the PAC, the well site data representing one or more operational parameters related to the well site operations;

deriving a probability for a given slope for each one of the one or more operational parameters as correlated to a different one of the one or more operational parameters to produce correlated probabilities for the one or more operational parameters over a sliding time window in real time;

deriving a resultant probability from the correlated probabilities for the one or more operational parameters over the sliding time window;

determining a slope for the resultant probability and estimate a time remaining until the resultant probability fails to meet a preselected threshold probability value based on the slope and that indicates an abnormal operation; and initiating a responsive action if the resultant probability fails to meet the preselected threshold probability value, wherein the responsive action includes at least one of a notification or a corrective action from at least one of the PAC or the supervisory controller to resolve the abnormal operation.

9. The method of claim 8, wherein the well site operations include pump operations performed by an electric semisubmersible pump (ESP) at the well site and the well site data includes data related to the pump operations by the ESP at the well site.

10. The method of claim 9, wherein deriving the resultant probability from the correlated probabilities is performed by taking an average of the correlated probabilities over a predefined time interval.

11. The method of claim 10, wherein the predefined time interval has a duration between one minute and 10 minutes.

12. The method of claim 8, wherein the resultant probability fails to meet the preselected threshold probability value when the estimated time remaining is less than a predetermined minimum time.

13. The method of claim 12, further comprising determining a correlated probability from among the correlated probabilities that most frequently falls below the average of the correlated probabilities, and identifying operational parameters associated with the correlated probability as causing the resultant probability to fail to meet the preselected threshold probability value.

14. The method of claim 8, wherein the preselected threshold probability value is one of a first threshold probability value and a second threshold probability value.

15. A non-transitory computer-readable medium containing program logic that, when executed by operation of one or more computer processors, causes the one or more processors to:

provide an access or entry point for a remote programmable automation controller (PAC) at a well site to a field network that allows the PAC to communicate with a supervisory controller;

receive well site data from the PAC, the well site data representing one or more operational parameters related to well site operations;

derive a probability for a given slope for each one of the one or more operational parameters as correlated to a different one of the one or more operational parameters to produce correlated probabilities for the one or more operational parameters over a sliding time window in real time;

derive a resultant probability from the correlated probabilities for the one or more operational parameters over the sliding time window;

determine a slope for the resultant probability and estimate a time remaining until the resultant probability fails to meet a preselected threshold probability value based on the slope and that indicates an abnormal operation; and initiate a responsive action if the resultant probability fails to meet the preselected threshold probability value, wherein the responsive action includes at least one of a notification or a corrective action from at least one of the PAC or the supervisory controller to resolve the abnormal operation.

16. The non-transitory computer-readable medium of claim 15, wherein the well site operations include pump operations performed by an electric semisubmersible pump (ESP) at the well site and the well site data includes data related to the pump operations by the ESP at the well site.

17. The non-transitory computer-readable medium of claim 16, wherein the program logic causes the one or more processors to derive the resultant probability from the correlated probabilities by taking an average of the correlated probabilities over a predefined time interval.

18. The non-transitory computer-readable medium of claim 17, wherein the predefined time interval has a duration between one minute and 10 minutes.

19. The non-transitory computer-readable medium of claim 18, wherein the resultant probability fails to meet the preselected threshold probability value when the estimated time remaining is less than a predetermined minimum time.

20. The non-transitory computer-readable medium of claim 15, wherein program logic causes the one or more processors to further determine which correlated probability from among the correlated probabilities most frequently falls below the average of the correlated probabilities, and identify operational parameters associated with the correlated probability as causing the resultant probability to fail to meet the preselected threshold probability value.

* * * * *